US008958037B2

(12) United States Patent
Murata et al.

(10) Patent No.: US 8,958,037 B2
(45) Date of Patent: Feb. 17, 2015

(54) LIQUID CRYSTAL DISPLAY ELEMENT COMPRISING AT LEAST TWO INSULATING LAYERS HAVING DIFFERENT DIELECTRIC CONSTANTS AND AT LEAST TWO PIXEL REGIONS WHICH DIFFER IN SHAPES OF EQUIPOTENTIAL LINES

(75) Inventors: Mitsuhiro Murata, Osaka (JP); Shoichi Ishihara, Osaka (JP); Takehisa Sakurai, Osaka (JP); Shuichi Kozaki, Osaka (JP); Tadashi Ohtake, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 683 days.

(21) Appl. No.: 13/143,620

(22) PCT Filed: Mar. 8, 2010

(86) PCT No.: PCT/JP2010/001599
§ 371 (c)(1),
(2), (4) Date: Jul. 7, 2011

(87) PCT Pub. No.: WO2010/137213
PCT Pub. Date: Dec. 2, 2010

(65) Prior Publication Data
US 2011/0279762 A1 Nov. 17, 2011

(30) Foreign Application Priority Data
May 29, 2009 (JP) .................................. 2009-131552

(51) Int. Cl.
*G02F 1/1337* (2006.01)
*G02F 1/1343* (2006.01)
(52) U.S. Cl.
CPC ................................ *G02F 1/134363* (2013.01)
USPC ........................................... 349/130; 349/129

(58) Field of Classification Search
CPC .................. G02F 1/1393; G02F 2001/133742; G02F 1/134336; G02F 1/1337
USPC ......................................... 349/123, 129, 130
See application file for complete search history.

(56) References Cited

U.S. PATENT DOCUMENTS 5,777,700 A * 7/1998 Kaneko et al. ................... 349/39
2001/0050742 A1 12/2001 Takeda et al.
(Continued)

FOREIGN PATENT DOCUMENTS

| JP | 10-133190 | 5/1998 |
| JP | 2000-193977 | 7/2000 |

(Continued)

OTHER PUBLICATIONS

International Search Report for PCT/JP2010/001599, mailed Apr. 20, 2010.

*Primary Examiner* — Paul Lee
(74) *Attorney, Agent, or Firm* — Nixon & Vanderhye, P.C.

(57) ABSTRACT

An vertical alignment type liquid crystal display element (10) which controls an orientation of liquid crystal molecules (52) in a liquid crystal layer (50) by use of a transverse electric field so as to carry out display. A CF-side first insulating layer (42a) and a CF-side second insulting layer (42b) which have respective different dielectric constants are provided, within a pixel in a planar view, on or above a CF substrate (24) so that a first electric field region (60) and a second electric field region (62) which differ in shapes of equipotential lines are formed in the pixel due to generation of a transverse electric field.

10 Claims, 14 Drawing Sheets

(56) References Cited

U.S. PATENT DOCUMENTS

| | | |
|---|---|---|
| 2002/0018166 A1 | 2/2002 | Matsumoto et al. |
| 2002/0030780 A1 | 3/2002 | Nishida et al. |
| 2004/0119899 A1* | 6/2004 | Miyazaki et al. ............... 349/38 |
| 2004/0252260 A1 | 12/2004 | Nishida et al. |
| 2005/0099570 A1 | 5/2005 | Matsumoto et al. |
| 2005/0280755 A1 | 12/2005 | Nishida et al. |
| 2006/0250561 A1 | 11/2006 | Takeda et al. |
| 2006/0274249 A1 | 12/2006 | Nishida et al. |
| 2009/0057741 A1* | 3/2009 | Sim ............................... 257/306 |
| 2009/0231530 A1* | 9/2009 | Nishimura ..................... 349/129 |

FOREIGN PATENT DOCUMENTS

| | | |
|---|---|---|
| JP | 2002-23179 | 1/2002 |
| JP | 2002-139736 | 5/2002 |
| JP | 2007-279478 | 10/2007 |

* cited by examiner

F I G. 1
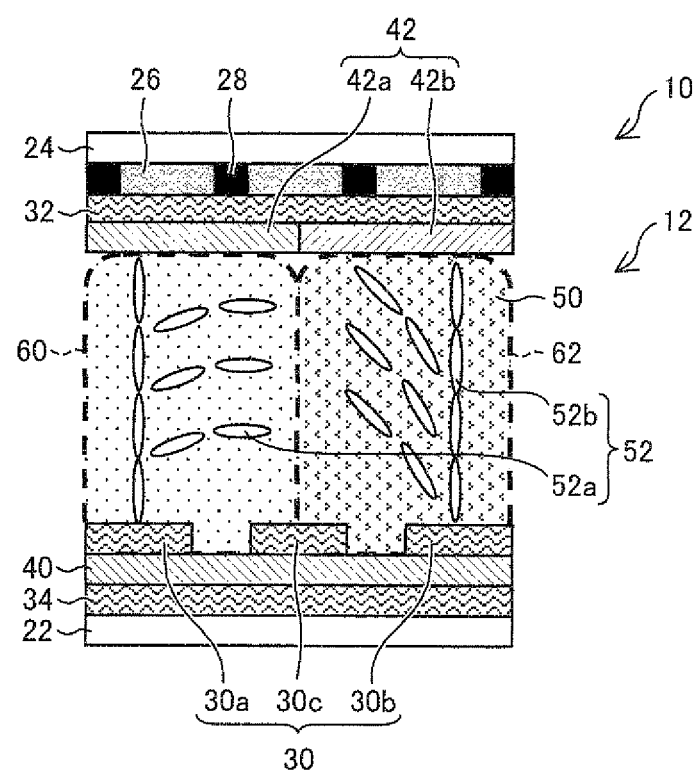

F I G. 2
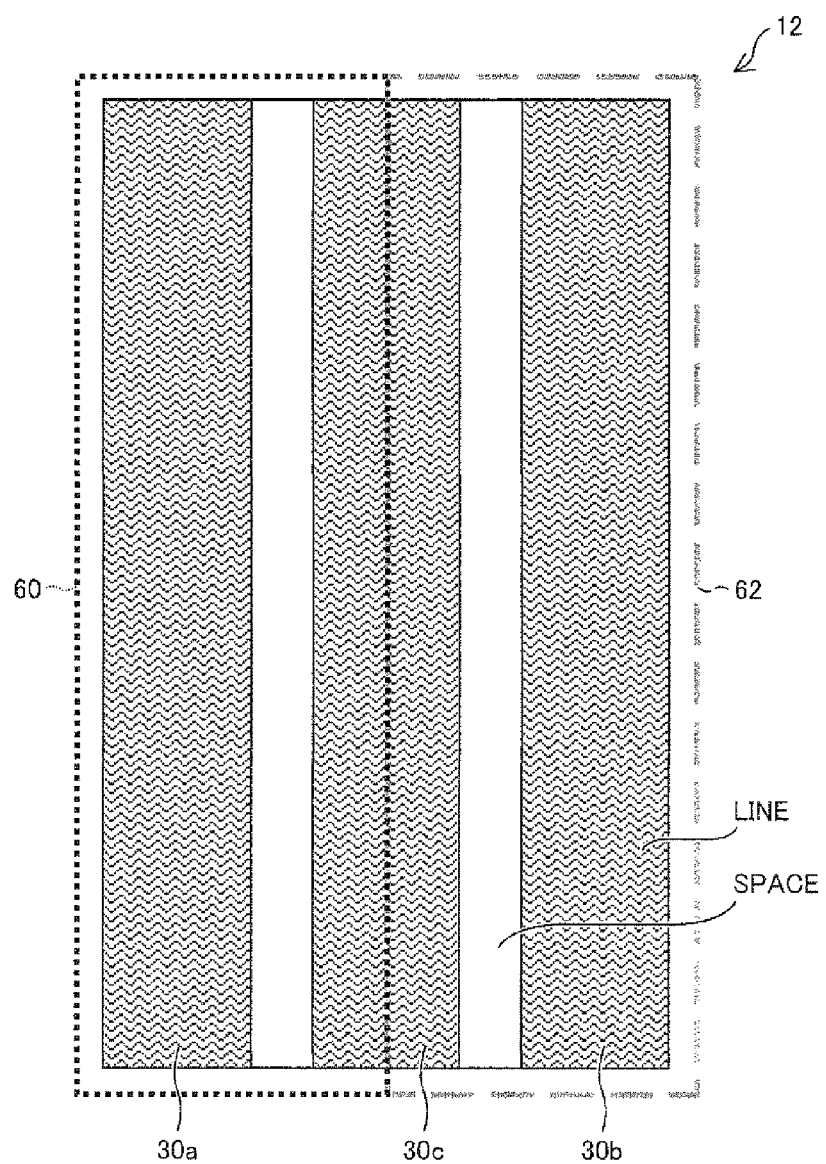

F I G. 9
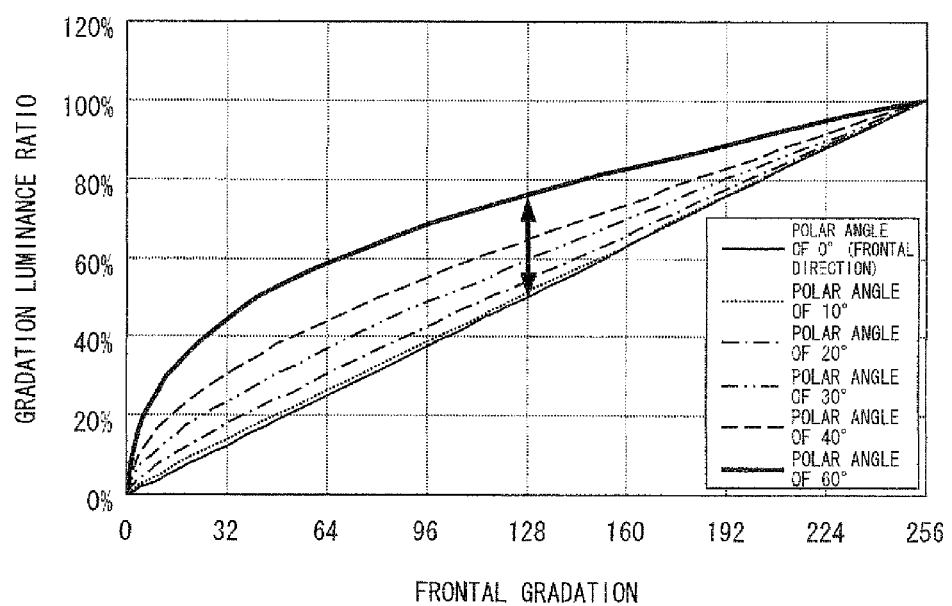

| EMBODIMENT | 1 | | | 2 | | | 3 |
|---|---|---|---|---|---|---|---|
| FIRST INSULATING LAYER THICKNESS (μm) | 1 | 2 | 3 | 1 | 2 | 3 | 3 |
| SECOND INSULATING LAYER THICKNESS (μm) | 1 | 2 | 3 | 1 | 2 | 3 | 3 |
| VIEWING ANGLE LEVEL | ○ | ◎ | ◎ | ○ | ○ | ○ | ○ |
| VIEWING ANGLE LEVEL (DIFFERENCE) | 30% | 26% | 25% | 34% | 32% | 30% | 36% |

(b)

| COMPARATIVE EXAMPLE | 1 | | | 2 | | | 3 | 4 | | |
|---|---|---|---|---|---|---|---|---|---|---|
| FIRST INSULATING LAYER THICKNESS (μm) | 1 | 2 | 3 | 1 | 2 | 3 | N/A | 1 | 2 | 3 |
| SECOND INSULATING LAYER THICKNESS (μm) | N/A | N/A | N/A | 1 | 2 | 3 | N/A | 1 | 2 | 3 |
| VIEWING ANGLE LEVEL | × | × | × | × | × | × | × | × | × | × |
| VIEWING ANGLE LEVEL (DIFFERENCE) | 51% | 51% | 52% | 38% | 41% | 48% | 53% | 48% | 50% | 50% |

F I G. 1 1
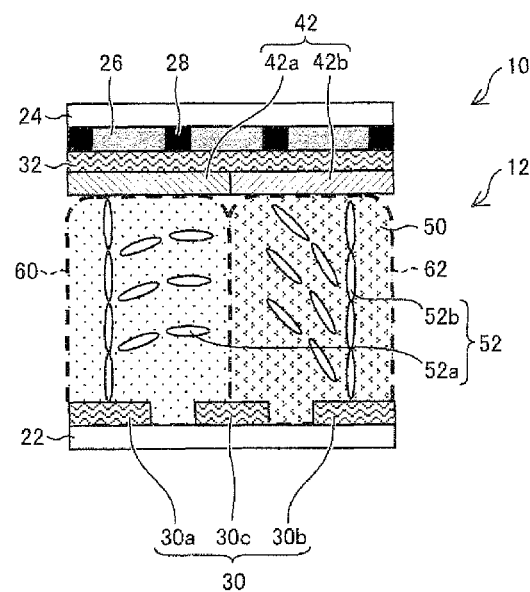
F I G. 1 2
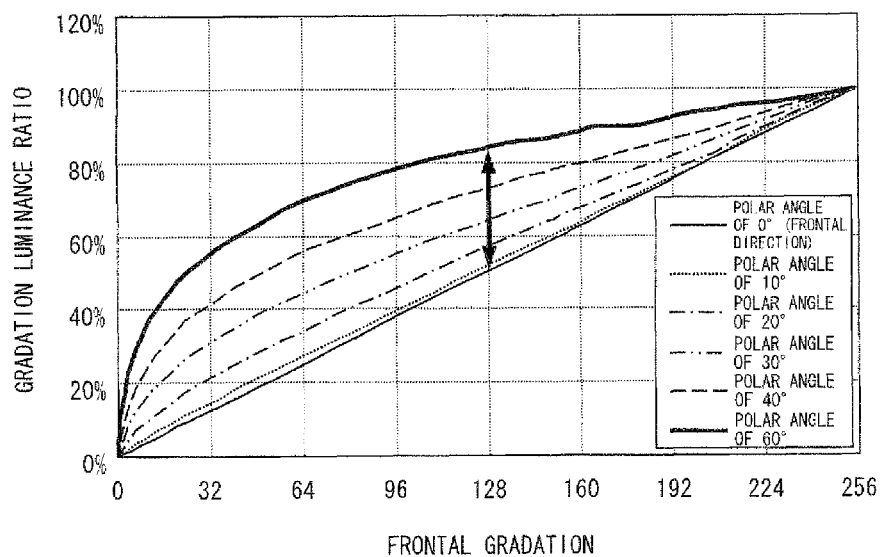

F I G. 1 9
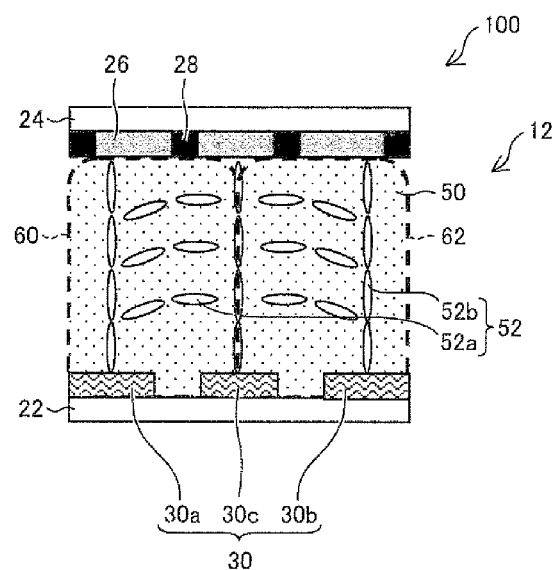
F I G. 2 0
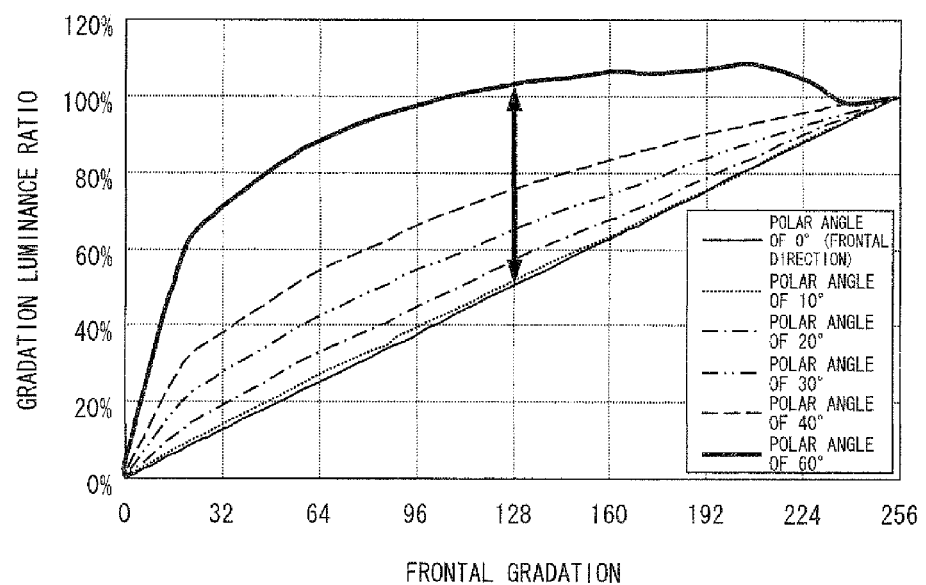

F I G. 2 1
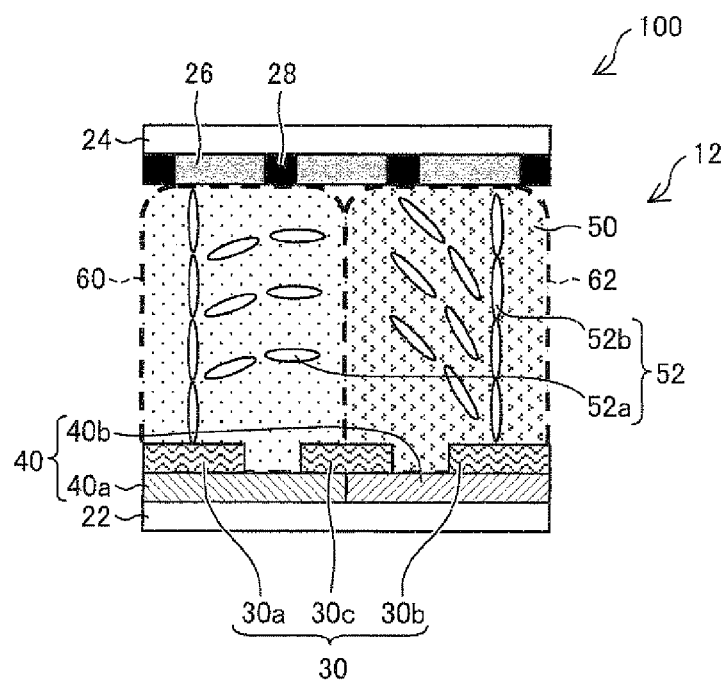

LIQUID CRYSTAL DISPLAY ELEMENT COMPRISING AT LEAST TWO INSULATING LAYERS HAVING DIFFERENT DIELECTRIC CONSTANTS AND AT LEAST TWO PIXEL REGIONS WHICH DIFFER IN SHAPES OF EQUIPOTENTIAL LINES

This application is the U.S. national phase of International Application No. PCT/JP2010/001599 filed 8 Mar. 2010 which designated the U.S. and claims priority to JP Patent Application No. 2009-131552 filed 29 May 2009, the entire contents of each of which are hereby incorporated by reference.

TECHNICAL FIELD

The present invention relates to a vertical alignment type liquid crystal display element that applies a transverse electric field so as to carry out display, and to a liquid crystal display apparatus having the vertical alignment type liquid crystal display element.

BACKGROUND ART

Liquid crystal display apparatuses which have liquid crystal display elements as their display sections are characterized by slimness, light weights, and low power consumption. Such liquid crystal display apparatuses are widely used in various fields.

Viewing angle characteristic is one of issues of the liquid crystal display elements. The reason why a display characteristic of a liquid crystal display element varies depending on a viewing angle is that since liquid crystal molecules have a rod-like shape, birefringence differs between a frontal view of the liquid crystal display element and an oblique view of the liquid crystal display element, and this causes a change in voltage-transmittance (VT) characteristic (hereinafter, also simply referred to as VT).

In view of this, there recently proposed various techniques for improving a viewing angle characteristic. Such techniques make it possible to partially change a VT characteristic in a driven pixel so as to allow the driven pixel to have two or more different VT characteristics (VT multiplication). This averages a mismatch in VT between a frontal view and an oblique view. The techniques thus improve a viewing angle characteristic. The following are representative techniques.

(Patent Literature 1)

Patent Literature 1 below discloses a technique by which VT multiplication is carried out in such a manner that an L/S (Line/Space width) of a drive electrode in a pixel is changed in a liquid crystal mode in which a transverse electric field is used as is the case with IPS (In-Plane Switching).

(Patent Literature 2)

Further, Patent Literate 2 discloses a technique by which VT multiplication is carried out in such a manner that a cell thickness is changed in a pixel.

(Patent Literature 3)

Further, Patent Literature 3 discloses a technique by which a viewing angle characteristic is improved in such a manner that an insulating layer which is used for changing a direction of an electric field in a pixel region is provided in a liquid crystal display apparatus which controls an electric field by use of upper and lower electrodes.

CITATION LIST

Patent Literature 1
Japanese Patent Application Publication, Tokukai, No. 2002-23179 A (Publication Date: Jan. 23, 2002)
Patent Literature 2
Japanese Patent Application Publication, Tokukaihei, No. 10-133190 A (Publication Date: May 22, 1998)
Patent Literature 3
Japanese Patent Application Publication, Tokukai, No. 2000-193977 A (Publication Date: Jul. 14, 2000)

SUMMARY OF INVENTION

Technical Problem

However, the conventional techniques have the following problems.

The technique of Patent Literature 1 has such a problem that since the effect becomes low if a wide space is not secured, in a pixel, for the space in the "line/space," an aperture ratio tends to be low, and this results in a decrease in transmittance.

The technique of Patent Literature 2 has such a problem that since a means for changing a cell gap has a large technical limitation, there is a difficulty in process formation.

The technique of Patent Literature 3 has such a problem that employable liquid crystal modes are limited. That is, the technique produces a high effect in a case where a VA method (method for driving in a vertical direction by use of an electric field) is adopted. In contrast, the technique does not produce a sufficient effect in a mode or the like in which, e.g., a transverse electric field is used.

In view of this, the present invention was made to attain the object. An object of the present invention is to provide a liquid crystal display element and a liquid crystal display apparatus which can be manufactured by simple steps, has an excellent viewing angle characteristic, and performs driving by use of a transverse electric field.

Specifically, the object of the present invention is to provide a liquid crystal display element and a liquid crystal display apparatus which have a viewing angle characteristic improved by VT multiplication in which without, e.g., special L/S formation nor gap formation, different electric fields are generated so as to be applied to liquid crystal molecules.

Solution to Problem

In order to attain the object, a liquid crystal display element of the present invention includes: two substrates; a liquid crystal layer sandwiched between the two substrates; and at least two insulating layers having respective different dielectric constants, the liquid crystal display element being a vertical alignment type liquid crystal display element which controls an orientation of liquid crystal molecules in the liquid crystal layer by use of a transverse electric field so as to carry out display, the at least two insulating layers being provided, within a pixel in a planar view, on or above at least one of the two substrates so that at least two regions which differ in shapes of equipotential lines are formed in the pixel due to generation of the transverse electric field.

According to the arrangement, a plurality of insulating layers having respective different dielectric constants are provided within a pixel in a planar view. Since the insulating layers have respective different dielectric constants, the shapes of equipotential lines differ between the regions corresponding respectively to the insulating layers. That is, two regions which differ in shapes of equipotential lines are formed within one pixel in a planar view. In other words, an electric field condition in the pixel is partially changed.

The difference in the shapes of equipotential lines between the two regions leads to a difference in orientation of liquid crystal molecules between the two regions. Therefore, according to the arrangement, at least two regions are formed within the one pixel between which an orientation of liquid crystal molecules differs. That is, two regions are formed within the one pixel for which two regions respective different voltage-transmittance curves are formed. Thus, the pixel has multiple VT characteristics (so-called VT multiplication).

This makes it possible to improve a viewing angle characteristic of a liquid crystal display element. Specifically, it is possible to reduce, e.g., excess brightness as viewed from an oblique direction.

The arrangement can be easily realized only by changing a dielectric constant of an insulating layer which is provided to a substrate.

Therefore, the arrangement makes it possible to provide a liquid crystal display element which can be manufactured by simple steps, has an excellent viewing angle characteristic, and performs driving by use of a transverse electric field.

The "transverse electric field" does not refer to an electric field generated by an electric potential difference between two opposed substrates but an electric field generated, by an electric potential difference caused on one substrate, parallel to the substrate.

Advantageous Effects of Invention

As described above, the liquid crystal display element of the present invention is arranged such that the at least two insulating layers are provided, within a pixel in a planar view, on or above at least one of the two substrates so that at least two regions which differ in shapes of equipotential lines are formed in the pixel due to generation of the transverse electric field.

This makes it possible to provide a liquid crystal display element which can be manufactured by simple steps, has an excellent viewing angle characteristic, and performs driving by use of a transverse electric field.

BRIEF DESCRIPTION OF DRAWINGS

FIG. 1 is a cross-sectional view schematically illustrating an arrangement of a liquid crystal display element of an embodiment of the present invention.

FIG. 2 is a plan view illustrating an arrangement of an electrode of the embodiment.

FIG. 9 is a graph of the embodiment, showing oblique gradation luminance ratios with respect to frontal gradation.

FIG. 10 is a view showing characteristics of liquid crystal elements. (a) of FIG. 10 corresponds to embodiments of the present invention whereas (b) of FIG. 10 corresponds to comparative examples.

FIG. 11 is a cross-sectional view schematically illustrating an arrangement of a liquid crystal display element of another embodiment of the present invention.

FIG. 12 is a graph of the another embodiment, showing oblique gradation luminance ratios with respect to frontal gradations.

FIG. 19 is a cross-sectional view schematically illustrating an arrangement of a liquid crystal display element of a third comparative example.

FIG. 20 is graph showing oblique gradation luminance ratios of the liquid crystal display element of the third comparative example, with respect to frontal gradations.

FIG. 21 is a cross-sectional view schematically illustrating an arrangement of a liquid crystal display element of a fourth comparative example.

DESCRIPTION OF EMBODIMENTS

Figure 3:
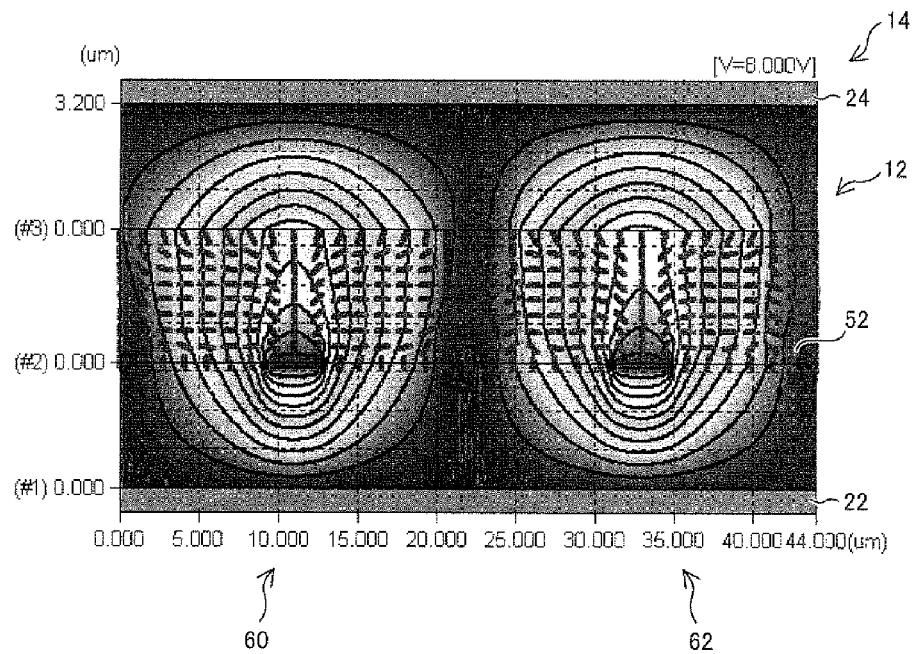
FIG. 3 is a view showing how electric fields are bent in a liquid crystal cell, and showing orientations of liquid crystal molecules in the liquid crystal cell.

The following describes embodiments of the present invention in detail.

First Embodiment

The following first describes one embodiment of the present invention, with reference to FIGS. 1 to 10 etc.

(Schematic Arrangement)

FIG. 1 is a cross-sectional view illustrating a schematic arrangement of a liquid crystal display element 10 of the present embodiment.

Specifically, FIG. 1 is a view selectively illustrating an area containing two electric field regions to be described later (hereinafter, the area is also referred to as two-region range 12) so as to illustrate an arrangement of a cross-section of the liquid crystal display element 10 (the same holds for other drawings below which are similar to FIG. 1).

The liquid crystal display element 10 is arranged such that a liquid crystal layer 50 containing liquid crystal molecules 52 is sandwiched between a pair of substrates: an array substrate 22 which is a first substrate and a color filter substrate (CF substrate) 24 which is a second substrate.

On the array substrate 22, comb-tooth electrodes 30 are provided each of which serves as a drive electrode which causes an electric field to be generated. On the other hand, color filters 26 and an counter electrode 32 are provided on the CF substrate 24.

(Array Substrate)

The following describes the array substrate 22 first.

On the array substrate 22, a third electrode 34, an array-side insulating layer 40, and the comb-tooth electrodes 30 are provided in this order toward the CF substrate 24 (i.e., toward upper layers).

The comb-tooth electrodes 30 are electrodes having a shape like a so-called comb.

Specifically, FIG. 1 illustrates, as an example of a minimal arrangement for generating two different electric fields, such an arrangement that three comb-tooth electrodes (30a, 30b, and 30c) are provided. More specifically, a first comb-tooth electrode 30a and a second comb-tooth electrode 30b are provided in the vicinity of both edge portions of the two-region range 12 in FIG. 1, respectively. Further, a third comb-tooth electrode 30c is provided in the vicinity of a central portion of the two-region range 12. That is, the third comb-tooth electrode 30c is provided between the first comb-tooth electrode 30a and the second comb-tooth electrode 30b.

On the other hand, the third electrode 34 and the array-side insulating layer 40 are provided across the two-region range 12 in a plane form (plane electrode).

Thus, the liquid crystal display element 10 of the present embodiment has a so-called FFS structure.

The number of comb-tooth electrodes which are provided in one pixel, i.e., the number of teeth is not particularly limited but is determined on the basis of a relationship between the number of teeth and a picture element pitch (pixel pitch). In a case where, e.g., a picture element pitch, a line width of a tooth, and a space width are 100 μm, 4 μm, and 4 μm respectively, it is possible to provide 12 teeth in one pixel.

That is, not less than two electric field regions which are different electric field regions are formed in one pixel of the liquid crystal display element 10. However, the number of the electric field regions is not limited. The number of the comb-tooth electrodes which are provided in one pixel can be determined in accordance with the number of the electric field regions, a picture element pitch, etc.

Normally, the first comb-tooth electrode 30a, the second comb-tooth electrode 30b, the third electrode 34, and the counter electrode 32 are given a same electric potential. Then, a voltage is applied to the third comb-tooth electrode 30c. This causes (i) an electric potential difference between the third comb-tooth electrode 30c (first tooth) and the first comb-tooth electrode 30a (another tooth), and (ii) an electric potential difference between the third comb-tooth electrode 30c (first tooth) and the second comb-tooth electrode 30b (further another tooth). Accordingly, an electric field is generated mainly by these electric potential differences so as to control an orientation of the liquid crystal molecules 52.

Further, since the liquid crystal display element 10 of the present embodiment is arranged such that the third electrode 34 is provided on the array substrate 22, a so-called transverse electric field is likely to be generated in a direction parallel to the array substrate 22.

According to the present embodiment, initial alignment of the liquid crystal molecules 52 is vertical alignment, and dielectric anisotropy of the liquid crystal molecules 52 is positive. Therefore, the liquid crystal molecules 52 are oriented in a direction parallel to the array substrate 22 by application of a voltage.

Thus, the liquid crystal display element 10 of the present embodiment is a vertical alignment type liquid crystal display element 10 which applies a transverse electric field so as to carry out display. In addition, at least two electric field regions are formed in one pixel. Specifically, a first electric field region 60 is formed in an area positionally corresponding to the first comb-tooth electrode 30a and the third comb-tooth electrode 30c, and a second electric field region 62 is formed in an area positionally corresponding to the second comb-tooth electrode 30b and the third comb-tooth electrode 30c. The first electric field region 60 and the second electric field region 62 are different in shape of an equipotential line. This is described later.

FIG. 2 shows, as a planar view, positional relationships among the two-region range 12 illustrated in FIG. 1 and the first and second electric field regions 60 and 62. FIG. 2 is a schematic view illustrating, as a planer view, the liquid crystal display element 10 of the present embodiment.

In the planar view, as described above, a region between the third comb-tooth electrode 30c provided in the vicinity of the central portion of the two-region range 12 and the first comb-tooth electrode 30a provided in the vicinity of one edge portion of the two-region range 12 is the first electric field region 60. Similarly, a region between the third comb-tooth electrode 30c and the second comb-tooth electrode 30b provided in the vicinity of the other edge portion of the two-region range 12 is the second electric field region 62. That is, two electric field regions are provided within the two-region range 12 in the planer view.

The first electric field region 60 and the second electric field region 62 positionally correspond to regions where two types of insulating layers (e.g., CF-side first insulating layer, CF-side second insulating layer) are provided, respectively.

(CF Substrate)

The following describes the CF substrate 24.

On the CF substrate 24, the color filters 26, the counter electrode 32, and the CF-side insulating layer 42 are provided in this order toward the array substrate 22 (i.e., toward upper layers). On the color filter 26, black matrixes 28 are provided.

(Electrode Material)

A material for each of the electrodes, specifically, the comb-tooth electrodes 30, the counter electrode 32, and the third electrode 34 is not particularly limited but can be, for example, a transparent electrode material (IZO (name of a product of Idemitsu Kosan Co., Ltd.)) made from indium oxide and zinc oxide, a transparent electrode material (ITO) made from indium oxide and tin oxide, or the like.

A method for forming each of the electrodes is not particularly limited. The following describes, as an example, a method in which a sputtering method is carried out. Examples of other methods encompass a vacuum deposition method and a plasma CVD method.

A film thickness of each of the electrodes is preferably not less than 100 Å but not more than 2000 Å.

(Insulating Layer)

On the counter electrode 32, the CF-side insulating layer 42 is provided. The liquid crystal display element 10 of the present embodiment is characterized in that the CF-side insulating layer 42 is made from two materials which are different in dielectric constant. That is, the two-region range 12 is divided nearly equally into two areas one of which corresponds to a CF-side first insulating layer 42a and the other one of which corresponds to a CF-side second insulting layer 42b.

In other words, the CF-side first insulating layer 42a is provided above that portion of the CF substrate 24 which positionally corresponds to the first electric field region 60. Similarly, the CF-side second insulating layer 42b is provided above that portion of the CF substrate 24 which positionally corresponds to the second electric field region 62.

The following describes an overview of a method for manufacturing the liquid crystal display element 10 of the present embodiment, and also describes, in more detail, the liquid crystal display element 10, in particular, the CF-side first insulating layer 42a and the CF-side second insulating layer 42b.

(Array Substrate)

With regard to the method for manufacturing the liquid crystal display element 10, the following first describes the array substrate 22. The array substrate 22 has the comb-tooth electrodes 30 as drive electrodes, and has an FFS structure which generates a parallel electric field.

According to the method, first, the third electrode 34 is formed in such a manner that a film made from ITO is formed, by a sputtering method, on an entire surface of a glass substrate which serves as the array substrate 22.

Then, an acrylic insulating material (first insulating material) having a relative permittivity ($\in$, hereinafter, also simply referred to as dielectric constant) of 3.7 is applied, by a spin coating method, onto an entire surface of the third electrode 34 so that a film made from the acrylic insulating material which film has a thickness from 1 μm to 3 μm covers the entire surface of the third electrode 34. The array-side insulating layer 40 is thus formed.

Then, those comb-tooth electrodes 30 are provided on the array-side insulating layer 40 which have an electrode width of 4 μm and an electrode pitch of 4 μm (L/S=4 μm/4 μm). Specifically, the comb-tooth electrodes 30 are formed so that the first comb-tooth electrode 30a, the second comb-tooth electrode 30b, and the third comb-tooth electrode 30c have a line width of 4 μm, and a conductor spacing between the first comb-tooth electrode 30a and the third comb-tooth electrode 30c and a conductor spacing between the second comb-tooth electrode 30b and the third comb-tooth electrode 30c is 4 μm.

A material for the comb-tooth electrodes 30 can be ITO, as is the case with the material for the third electrode 34.

Then, an alignment film (not illustrated) is formed on the comb-tooth electrodes 30, specifically, on the comb-tooth electrodes 30 and on those portions of the array-side insulating layer 40 on which no comb-tooth electrode 30 is provided (hereinafter, also simply referred to as "on the comb-tooth electrodes 30"). Specifically, an alignment-film coating material manufactured by JSR Corp. (product name: JALS-204 (5 wt. %, gamma-butyrolactone solution)) is applied onto the comb-tooth electrodes 30 by a spin coating method, and a semifinished product thus fabricated is then baked for 2 hours at 200° C. The alignment film is thus formed. A film thickness of the alignment film is, e.g., 1000 Å.

(CF Substrate)

The following describes the CF substrate 24.

First, the color filters 26 and the black matrixes 28 are provided on a glass substrate which serves as the CF substrate 24.

Then, a film made from ITO is formed, by a sputtering method, on an entire surface of a layer made up of the color filters 26 and the black matrixes 28. The counter electrode 32 is thus formed.

Then, the CF-side insulating layer 42 is formed on the counter electrode 32. In the liquid crystal display element 10 of the present embodiment, the CF-side insulating layer 42 has two regions which are different in dielectric constant. That is, the CF-side insulating layer 42 is made up of the CF-side first insulating layer 42a and the CF-side second insulating layer 42b which are different in dielectric constant, as illustrated in FIG. 1. The CF-side insulating layer 42 is divided into the CF-side first insulating layer 42a and the CF-side second insulating layer 42b, in the vicinity of the central portion of the two-region range 12. In a planar view, accordingly, the CF-side first insulating layer 42a is provided in nearly half the two-region range 12, and the CF-side second insulating layer 42b is provided in remaining nearly half the two-region range 12.

Specifically, first, a film made from the acrylic insulating material having $\in$ of 3.7 (first insulating material) is formed by a spin coating method so that an insulating film having a thickness from 1 μm to 3 μm is formed across the two-region range 12. In other words, an insulating layer made from the first insulating material is formed on an entire surface of the counter electrode 32.

Then, in order that insulating layers which are different in dielectric constant are formed, a certain portion of the insulating layer made from the first insulating material is removed by photolithography in which a mask is used. That portion of the insulating layer which has not been removed by photolithography but has been left is the CF-side first insulating layer 42a. On the other hand, a hollow formed due to removal of the certain portion of the insulating layer positionally corresponds to the CF-side second insulating layer 42b to be described later. A region positionally corresponding to the CF-side first insulating layer 42a and a region positionally corresponding to the CF-side second insulating layer 42b are different in the aforementioned VT characteristic.

Specifically, a film made from SiN ($\in$=6.9) which is a second insulating material is formed in the hollow by a sputtering method so as to have the same film thickness as the CF-side first insulating layer 42a. The CF-side second insulating layer 42b is thus formed.

The CF-side first insulating layer 42a and the CF-side second insulating layer 42b are thus formed which have the same film thickness but are different in dielectric constant.

In order that an electric field to be described later is efficiently bent, a thickness of the CF-side insulating layer 42 is preferably, e.g., not less than 1 μm but not more than 5.0 μm, and more preferably, not less than 2.3 μm but not more than 5.0 μm.

A difference in dielectric constant between the first insulating material which is used for forming the CF-side first insulating layer 42a and the second insulating material which is used for forming the CF-side second insulating layer 42b is preferably not less than 2 but not more than 4.5, from a viewpoint of efficient bending of an electric field.

A concrete insulating material is not particularly limited but can be, e.g., the acrylic resin (dielectric constant of, e.g., not less than 3.5 but not more than 4), silicon dioxide (dielectric constant of not less than 2 but not more than 2.5), or the like.

A method for forming the CF-side first insulating layer 42a and the CF-side second insulating layer 42b can be selected according to an employed insulating material etc. For example, it is possible to employ a sputtering method, a vacuum deposition method, a plasma CVD method, a coating method, or the like.

According to the explanation above, the array-side insulating layer 40 and the CF-side insulating layer 42 are made from a same insulating material. Specifically, both the CF-side first insulating layer 42a and the array-side insulating layer 40 are made from the acrylic insulating material which is the first insulating material.

However, the liquid crystal display element 10 does not require that the array-side insulating layer 40 and the CF-side insulating layer 42 be made from a common insulating material. For example, in the arrangement above, the array-side insulating layer 40, the CF-side first insulating layer 42a, and the CF-side second insulating layer 42b can be made from different insulating materials, respectively.

As is the case with the array substrate 22, then, the alignment-film coating material manufactured by JSR Corp. (product name: JALS-204 (5 wt. %, gamma-butyrolactone solution)) is applied onto the CF-side insulating layer 42 by a spin coating method, and a semifinished product thus fabricated is then baked for 2 hours at 200° C. The alignment film (not illustrated) is thus formed. A film thickness of the alignment film is, e.g., 1000 Å, as is the case with the array substrate 22.

(Attachment)

Then, resin beads manufactured by Sekisui Chemical Co., Ltd. which resin beads have a diameter of 3.25 μm (product name: Micropearl SP20325) are dispersed on one of the array substrate 22 and the CF substrate 24.

On the other hand, a sealing resin manufactured by Mitsui Toatsu Chemicals, Inc. (product name: STRUCTBOND XN-21S) is printed on a substrate opposed to the one of the array substrate 22 and the CF substrate 24 (i.e., printed on the CF substrate 24 or the array substrate 22).

Then, the array substrate 22 and the CF substrate 24 are attached to each other, and then, baked for 1 hour at 135° C. so that a liquid crystal cell is fabricated.

The liquid crystal cell can be arranged such that, e.g., columnar spacers which control a gap between the array substrate 22 and the CF substrate 24 are provided in positions corresponding to the comb-tooth electrodes 30.

(Liquid Crystal Injection)

Then, liquid crystal is injected into the liquid crystal cell. According to the present embodiment, a positive type liquid crystal material ($\Delta\epsilon=20$, $\Delta n=0.15$) manufactured by Merck Ltd. is injected into the liquid crystal cell by a liquid crystal filling vacuum injection method, and then, the liquid crystal cell is sealed.

Then, a polarization plate is attached to the liquid crystal cell into which the liquid crystal has been injected. The liquid crystal display element is thus fabricated.

First Comparative Example

The following describes an arrangement of a comparative example which is compared in viewing angle characteristic etc. with the liquid crystal display element 10 of the present embodiment.

Figure 15:
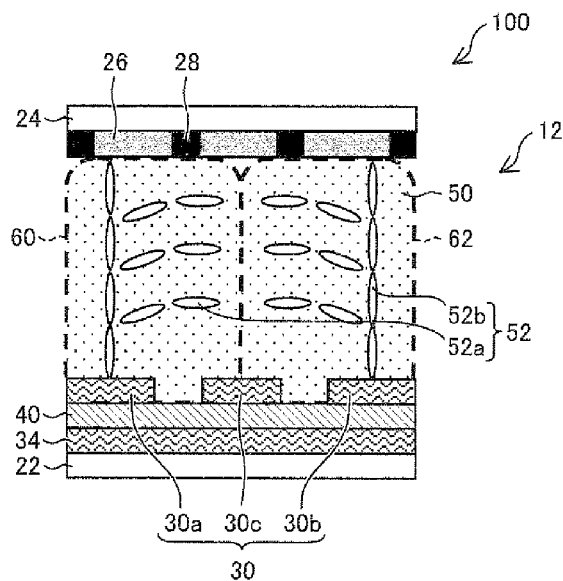
FIG. 15 is a cross-sectional view schematically illustrating an arrangement of a liquid crystal display element of a first comparative example.

FIG. 15 is a cross-sectional view illustrating a schematic arrangement of a liquid crystal display element 100 of the first comparative example.

With reference to FIG. 15, the following mainly describes differences between the liquid crystal display element 100 and the liquid crystal display element 10 of the first embodiment.

The liquid crystal display element 100 of the first comparative example is different from the liquid crystal display element 10 of the first embodiment in that neither the counter electrode 32 nor the CF-side insulating layer 42 is provided on the CF substrate 24. The following describes an overview of a method for manufacturing the liquid crystal display element 100 and an overview of the arrangement of the liquid crystal display element 100.

As for the liquid crystal display element 100 of the first comparative example, a third electrode 34 is provided in such a manner that a film made from ITO is formed, by a sputtering method, on an entire surface of a glass substrate which serves as an array substrate 22.

Then, an array-side insulating layer 40 is formed on the third electrode 34 in such a manner that the acrylic first insulating material ($\epsilon=3.7$) is applied, by a spin coating method, onto an entire surface of the third electrode 34 so that a film made from the acrylic first insulating material which film has a thickness from 1 μm to 3 μm covers the entire surface of the third electrode 34.

Then, those comb-tooth electrodes 30 made from ITO are provided on the array-side insulating layer 40 which have an electrode width of 4 μm and an electrode pitch of 4 μm.

Further, an alignment film (not illustrated) is formed on the comb-tooth electrodes 30 in such a manner that the alignment-film coating material manufactured by JSR Corp. (product name: JALS-204 (5 wt. %, gamma-butyrolactone solution)) is applied onto the comb-tooth electrodes 30 by a spin coating method, and a semifinished product thus fabricated is then baked for 2 hours at 200° C.

On the other hand, color filters 26 and black matrixes 28 are provided on a glass substrate which serves as a CF substrate 24. Further, an alignment film (not illustrated) is provided on the color filters 26 and the black matrixes 28. The alignment film is formed in such a manner that the alignment-film coating material manufactured by JSR Corp. (product name: JALS-204 (5 wt. %, gamma-butyrolactone solution)) is applied onto the color filters 26 and the black matrixes 28 by a spin coating method, and a semifinished product thus fabricated is then baked for 2 hours at 200° C.

The alignment film of the CF substrate 24 and the alignment film of the array substrate 22 have a film thickness of 1000 Å.

Then, the CF substrate 24 and the array substrate 22 are attached to each other by using, as a sealing material, the sealing resin manufactured by Mitsui Toatsu Chemicals, Inc. (product name: STRUCTBOND XN-21S) via the resin beads manufactured by Sekisui Chemical Co., Ltd. which resin beads have a diameter of 3.25 μm (product name: Micropearl SP20325). The CF substrate 24 and the array substrate 22 which have been thus attached to each other are baked for 1 hour at 135° C. A liquid, crystal cell is thus fabricated.

Then, the positive type liquid crystal material ($\Delta\epsilon=20$, $\Delta n=0.15$) manufactured by Merck Ltd. is injected into the liquid crystal cell by a liquid crystal filling vacuum injection method, and then, the liquid crystal cell is sealed. Then, a polarization plate is attached to the liquid crystal cell. The liquid crystal display element 100 of the first comparative example is thus fabricated.

(Viewing Angle Characteristic)

The following describes viewing angle characteristics etc. of the liquid crystal display element 10 of the present embodiment and those of the liquid crystal display element 100 of the first comparative example.

The liquid crystal display element 10 of the present embodiment has an improved viewing angle characteristic, as compared to the liquid crystal display element 100 of the first comparative example. The improved viewing angle characteristic is brought about by a difference in how an electric filed in the liquid crystal cell is bent, i.e., by a difference in shapes of equipotential lines.

(How Electric Field is Bent)

Figure 16:
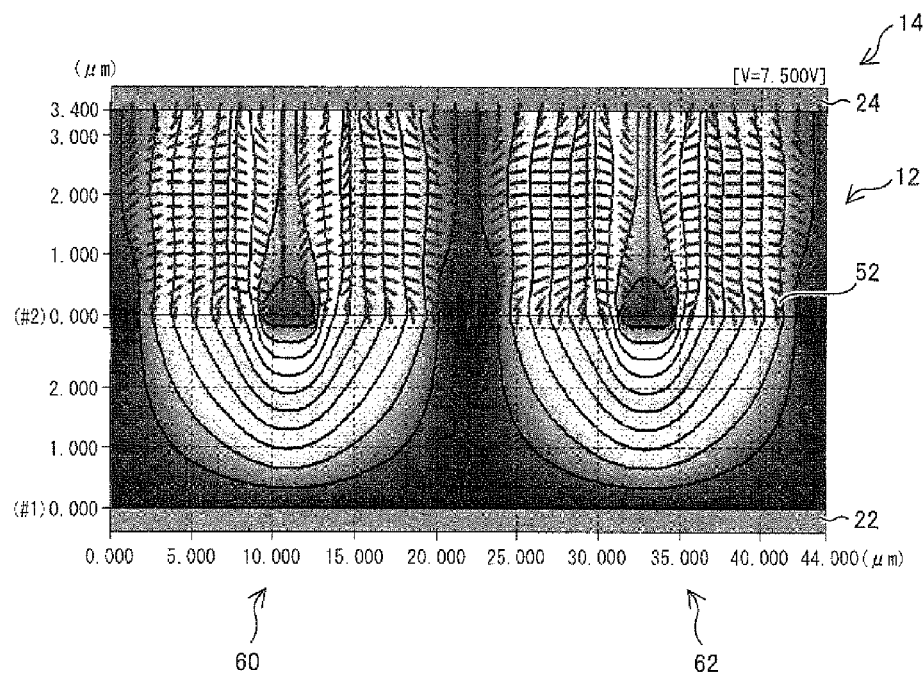
FIG. 16 is a view showing how electric fields are bent in a liquid crystal cell, and showing orientations of liquid crystal molecules in the liquid crystal cell.

With reference to FIGS. 3 and 16, the following describes how an electric filed in a liquid crystal cell 14 is bent, and describes an orientation of the liquid crystal molecules 52.

Each of FIGS. 3 and 16 is a view showing how an electric field in the liquid crystal cell 14 is bent, and showing the orientation of the liquid crystal molecules 52. FIG. 3 shows a liquid crystal cell 14 of the liquid crystal display element 10 of the present embodiment whereas FIG. 16 shows a liquid crystal cell 14 of the liquid crystal display element 100 of the first comparative example.

Present Embodiment

As shown in FIG. 3, two electric fields are formed in the two-region range 12 in the liquid crystal cell 14 of the present embodiment. The two electric fields are different in shape.

In other words, the two electric fields are formed in the first and second electric field regions 60 and 62, respectively, and are different in shapes of equipotential lines (i.e., different in how the equipotential lines are bent).

The following describes this more specifically, with reference to FIG. 3.

As shown in FIG. 3, equipotential lines in the first electric field region 60 and those in the second electric field region 62 are common in that any equipotential line has a looped shape in a corresponding electric field region.

However, such looped shapes of equipotential lines differ between the first electric field region 60 and the second electric field region 62. That is, the equipotential lines in the first electric field region 60 have more distorted shapes than those in the second electric field region 62.

Specifically, in the vicinity of the array substrate 22, the equipotential lines in the first electric field region 60 are formed at smaller intervals than those of the equipotential lines in the second electric field region 62. In contrast, in the vicinity of the CF substrate 24, the equipotential lines in the first electric field region 60 are formed at larger intervals than those of the equipotential lines in the second electric field region 62.

As described above, the shapes of equipotential lines differ between the first electric field region 60 and the second electric field region 62. Accordingly, an orientation (director) of the liquid crystal molecules 52 differs between the first electric field region 60 and the second electric field region 62 (e.g., FIG. 1 illustrates first liquid crystal molecules 52a and second liquid crystal molecules 52b as liquid crystal molecules 52 in the first electric field region 60 and liquid crystal molecules 52 in the second electric field region 62, respectively). As a result, a VT characteristic (VT curve) differs between the first electric field region 60 and the second electric field region 62. That is, the liquid crystal display element 10 of the present embodiment has multiple. VT characteristics (so-called VT multiplication).

First Comparative Example

The following describes the liquid crystal display element 100 of the first comparative example, with reference to FIG. 16.

The liquid crystal cell 14 in the liquid crystal display element 100 of the first comparative example is the same as the liquid crystal cell 14 in the liquid crystal display element 10 of the present embodiment in that the two electric fields are formed in the two-region range.

However, there is a difference in that in the liquid crystal cell 14 in the liquid crystal display element 100, the two electric fields are formed so as to have almost same shapes. As for the liquid crystal display element 10 of the first embodiment, the shapes of equipotential lines of an electric field differ between the first electric field region 60 and the second electric field region 62. As for the liquid crystal display element 100 of the first comparative example, in contrast, the shapes of equipotential lines of an electric field hardly differ between the first electric field region 60 and the second electric field region 62. Another difference between the liquid crystal display elements 10 and 100 is that in the liquid crystal cell 14 in the liquid crystal display element 100, any equipotential line does not form a loop.

Further, equipotential lines are bent in the same way between the first electric field region 60 and the second electric field region 62. Therefore, an orientation (director) of liquid crystal molecules 52 does not differ between the first electric field region 60 and the second electric field region 62.

As a result, a VT characteristic (VT curve) does not differ between the first electric field region 60 and the second electric field region 62.

(Gradation-Luminance Ratio)

Figure 4:
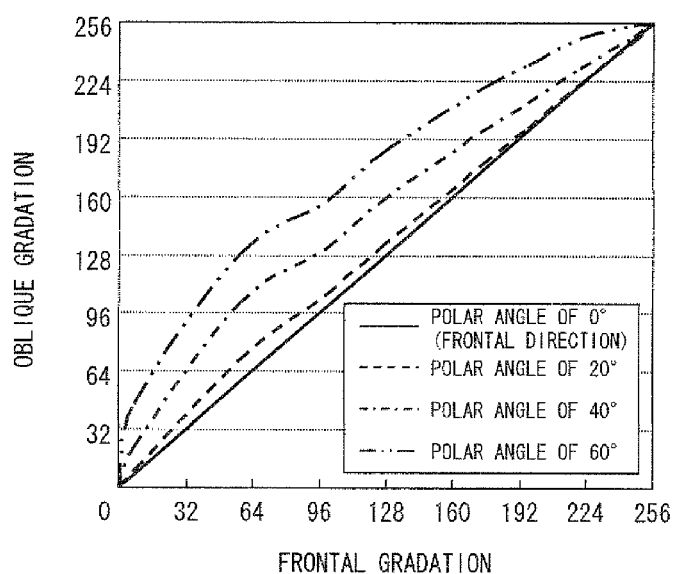
FIG. 4 is a graph of the embodiment, showing oblique gradations with respect to frontal gradations.
Figure 17:
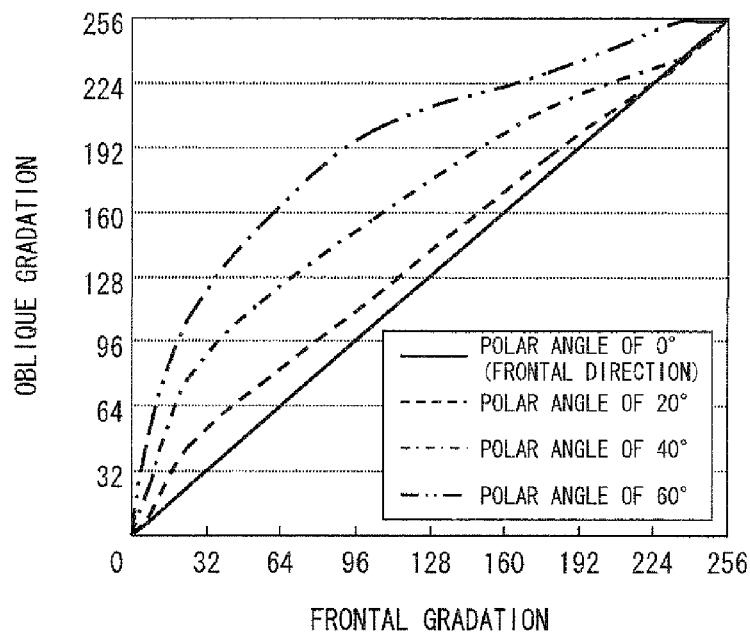
FIG. 17 is a graph showing, for the liquid crystal display element of the first comparative example, oblique gradations with respect to frontal gradations.

The following describes gradation-luminance ratio, with reference to FIGS. 4 and 17.

FIG. 4 is a graph showing a viewing angle characteristic of the liquid crystal display element 10 of the present embodiment. FIG. 17 is a graph showing a viewing angle characteristic of the liquid crystal display element 100 of the first comparative example. Specifically, each of FIGS. 4 and 17 shows oblique gradations with respect to frontal gradations. The frontal gradations refer to gradations obtained in a case where the liquid crystal display element 10 or 100 is viewed from its normal direction (azimuth 0°, polar angle 0°). The oblique gradations refers to gradations obtained in a case where the liquid crystal display element 10 or 100 is viewed from a direction tilted with respect to the normal direction at an azimuth of 45° with respect to an absorption axis of the polarization plate. Each of FIGS. 4 and 17 shows gradations obtained in cases where polar angles which are inclination angles with respect to the normal direction are 0° (frontal (normal) direction), 20°, 40°, and 60°. In each of FIGS. 4 and 17, specifically: a continuous line indicates a polar angle of 0° (frontal direction); a dashed line indicates a polar angle of 20°; a dashed-one dotted line indicates a polar angle of 40°; and a dashed-two dotted line indicates a polar angle of 60°.

Further, each of FIGS. 4 and 17 shows a gradation range of 256 gradation levels. As described above, the liquid crystal display element 10 of the present embodiment has two different VT curves of the liquid crystal cell 14. Therefore, as for FIG. 4, respective VT curves of the first electric field region 60 and the second electric field region 62 in the liquid crystal display element 10 of the present embodiment are synthesized so that the graph of FIG. 4 shows gradations as indexes each of which indicates a luminance ratio with respect to a gradation voltage.

Each of FIGS. 4 and 17 shows that in a case where a polar angle is large, the liquid crystal display element 10 of the present embodiment makes it possible to drastically suppress a raise of luminance ratios of the oblique direction with respect to the frontal direction, as compared to the liquid crystal display element 100 of the first comparative example.

FIG. 4 shows a viewing angle characteristic of the liquid crystal display element 10 whose CF-side insulating layer has a thickness of 3 μm.

(Director and Birefringence)

Before describing the raise of the luminance ratios, the following describes a director of a liquid crystal molecule 52 and a birefringence, the director and a VT curve, and synthesis of different VT curves, with regard to finding a luminance ratio with respect to each of gradation voltages.

Figure 5:
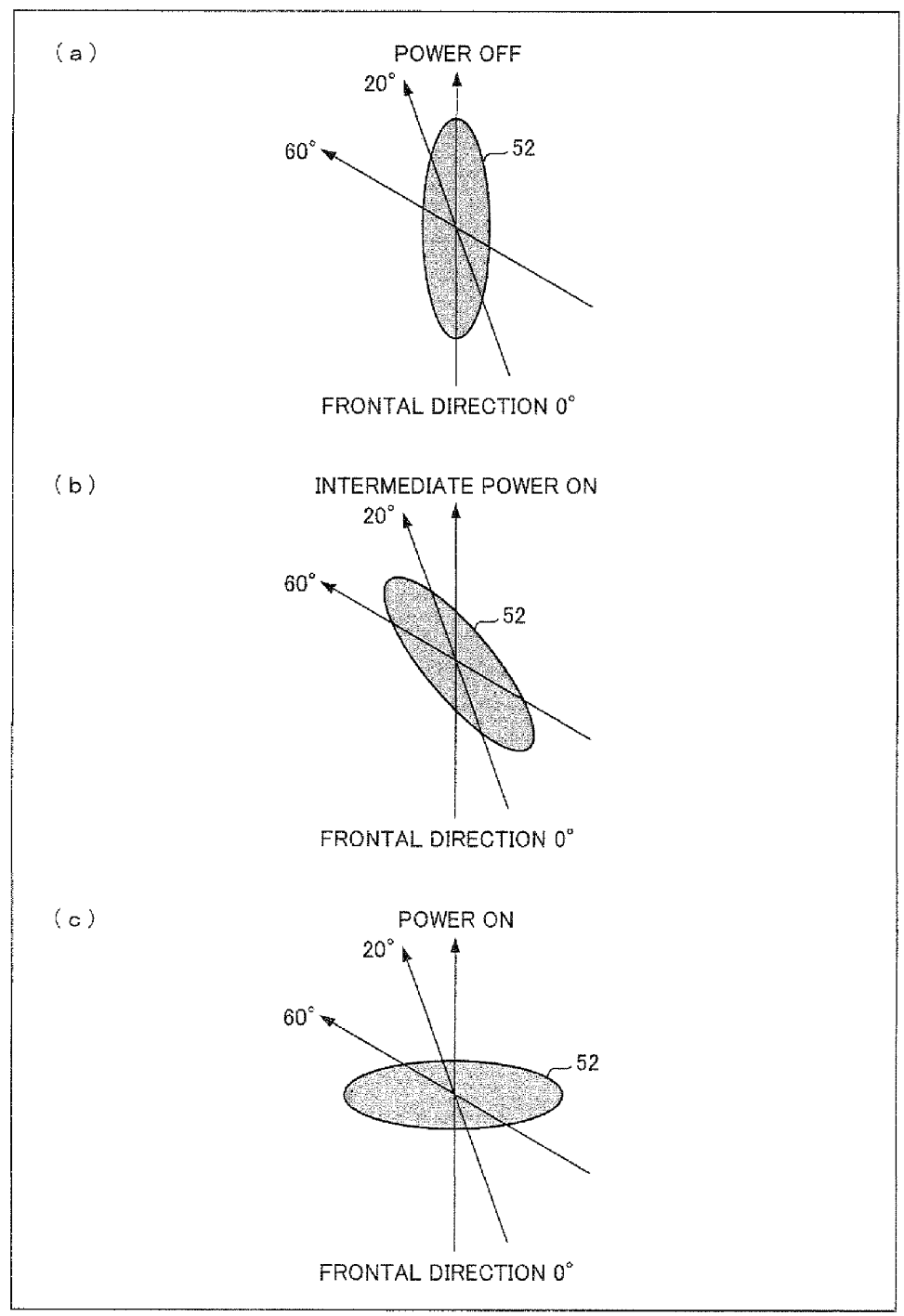
FIG. 5 is a view illustrating liquid crystal molecules and traveling directions of light. (a) of FIG. 5 illustrates a state where no voltage is applied. (b) of FIG. 5 illustrates a state where an intermediate voltage is applied. (c) of FIG. 5 illustrates a state where a full voltage is applied.

Each of (a) to (c) of FIG. 5 is a view illustrating a liquid crystal molecule 52 and a traveling direction of light.

(a) to (c) of FIG. 5 illustrate directors of the liquid crystal molecule 52 for cases where: no voltage is applied; an intermediate voltage is applied; and a full voltage is applied, respectively. Arrows in FIG. 5 indicate traveling directions of light, specifically: a frontal direction (front 0°); a direction tilted at a polar angle of 20° (20°); and direction tilted at a polar angle of 60° (60°).

The following first describes a relationship between an inclination of the liquid crystal molecule 52 and a birefringence.

As illustrated in (a) to (e) of FIG. 5, an electric field is applied (e.g., no voltage→a intermediate voltage→full voltage) to the liquid crystal molecule 52 having a rod shape so that the director of the liquid crystal molecule 52 is changed. At this stage, particularly, in a case where a voltage close to the intermediate voltage is applied to the liquid crystal molecule 52, an optical path along a longer direction of the liquid crystal molecule 52 becomes longer particularly for oblique light (polar angle from 20° to 60°).

A birefringence is a product of a refractive index difference Δn and a distance d. It follows that a birefringence is large in a case where the voltage close to the intermediate voltage is applied to the liquid crystal molecule 52. The birefringence occurs in an oblique direction. This increases a frontal transmittance. That is, the voltage close to the intermediate voltage causes a large luminance difference between the frontal direction and the oblique direction.

As described above, the director of the liquid crystal molecule 52 causes a change in birefringence so that a transmittance is changed.

Since the shapes of equipotential lines of the liquid crystal display element 10 of the present embodiment differ between the first electric field region 60 and the second electric field region 62, directors of the liquid crystal molecules 52 also differ between the first electric field region 60 and the second electric field region 62. The following describes this by taking, as an example, a case where the intermediate voltage is applied to the liquid crystal molecule 52.

(Intermediate Voltage)

Figure 6:
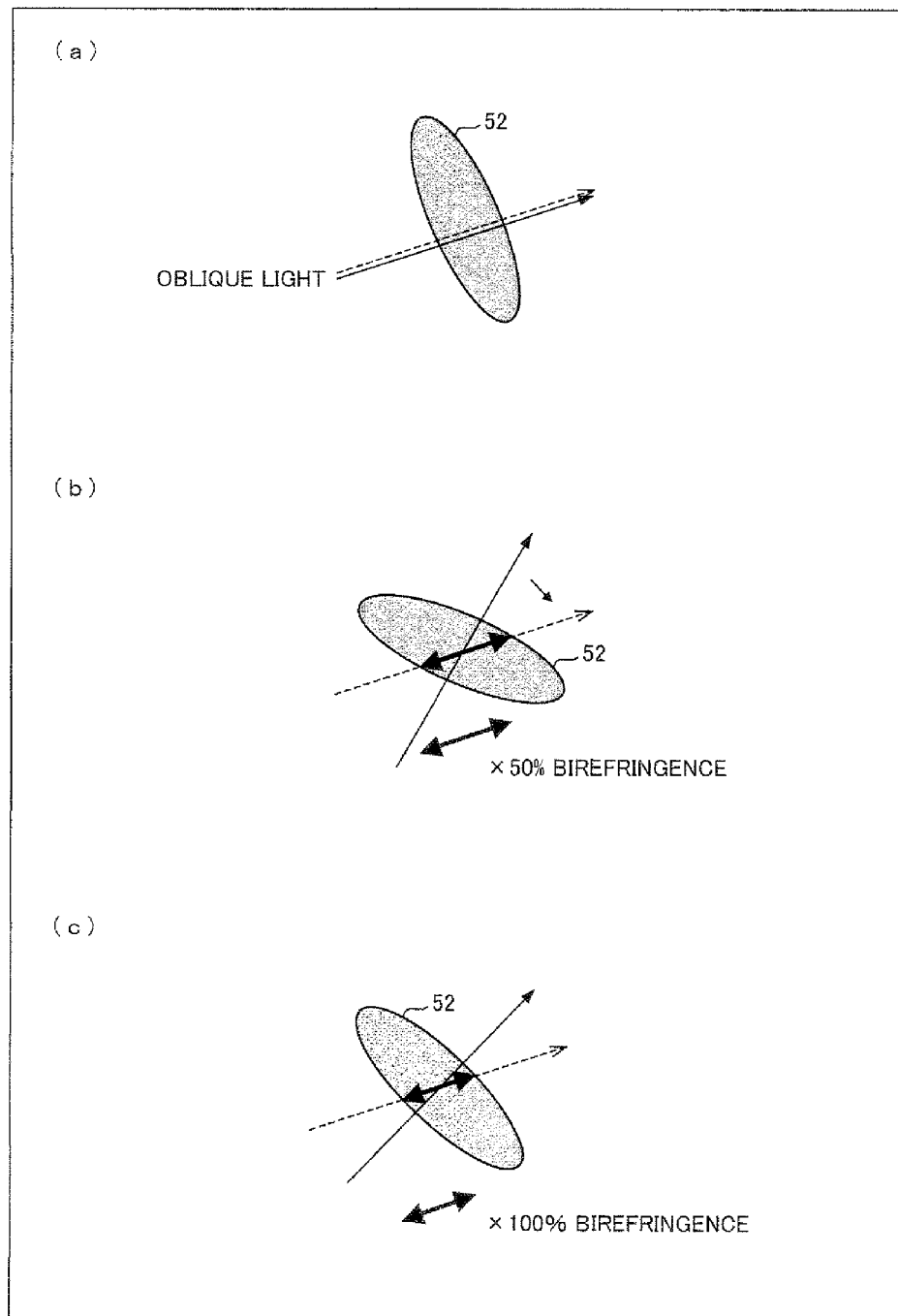
FIG. 6 is a view illustrating liquid crystal molecules and traveling directions of light, for a case where the intermediate voltage is applied the liquid crystal molecules. (a) of FIG. 6 illustrates a case of a first electric field region. (b) of FIG. 6 illustrates a case of a second electric field region. (c) of FIG. 6 illustrates a case of a comparative example.

Each of (a) to (c) of FIG. 6 illustrates a director of the liquid crystal molecule 52 and a traveling direction of light, for the case where the intermediate voltage is applied to the liquid crystal molecule 52.

Specifically, (a) and (b) of FIG. 6 correspond to the liquid crystal display element 10 of the present embodiment. (a) of FIG. 6 illustrates the director of the liquid crystal molecule 52 in the first electric field region 60. Similarly, (b) of FIG. 6 illustrates the director of the liquid crystal molecule 52 in the second electric field region 62.

On the other hand, (c) of FIG. 6 corresponds to the liquid crystal display element 100 of the first comparative example, and illustrates the director of the liquid crystal display molecule 52. In the liquid crystal display element 100 of the first comparative example, the director of the liquid crystal molecule 52 does not differ between the first electric field region 60 and the second electric field region 62, as described above.

A birefringence is minimal in a case where a light beam and a short axis of the director of the liquid crystal molecule 52 perpendicularly intersect with each other.

As illustrated in (a) of FIG. 6, the liquid crystal display element 10 of the present embodiment has a minimal birefringence caused by the liquid crystal molecule 52 in the first electric field region 60 in a case where the intermediate voltage is applied to the liquid crystal molecule 52. As illustrated in (b) of FIG. 6, in contrast, the liquid crystal molecule 52 in the second electric field region 62 causes a larger birefringence than that of the liquid crystal molecule 52 in the first electric field region 60 in a case where the intermediate voltage is applied to the liquid crystal molecule 52 in the second electric field region 62. In this case, the birefringence is larger than that birefringence of the liquid crystal display element 10 of the first comparative example which is shown in (c) of FIG. 6.

An average of all birefringences of the liquid crystal display element 10 of the present embodiment is a birefringence obtained by synthesizing a birefringence caused in the first electric field region 60 and a birefringence caused in the second electric field region 62.

The average is smaller than a birefringence caused in that liquid crystal display element 100 of the first comparative example 1 which is illustrated in (c) of FIG. 6.

As shown in FIGS. 4 and 17, therefore, the liquid crystal display element 10 of the present embodiment makes it possible to suppress the raise of the transmittances of the oblique direction, as compared to the liquid crystal display element 100 of the first comparative example.

The following specifically describes a VT curve which represents the average of all the birefringences of the present embodiment.

(Director and VT Curve, and Synthesis of VT Curves)

Figure 7:
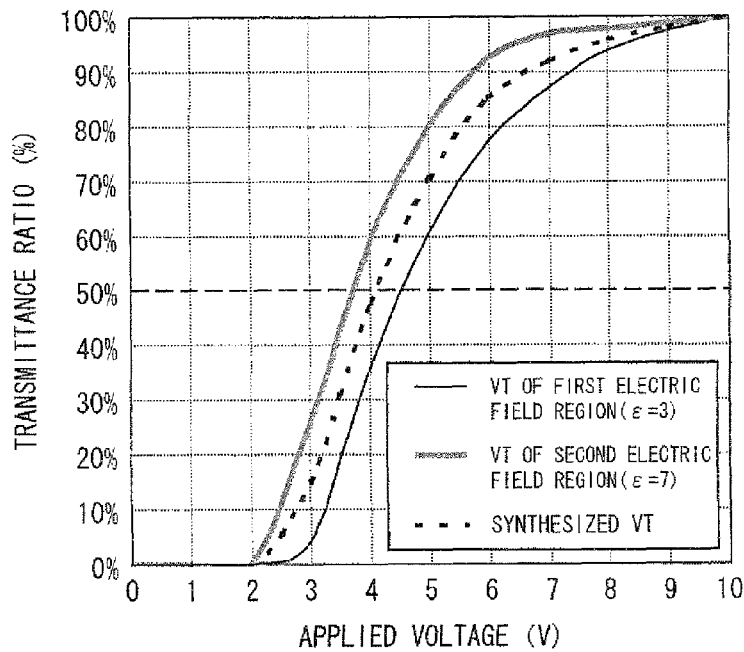
FIG. 7 is a graph showing synthesis of two VT curves.

FIG. 7 shows, for the frontal direction, respective VT curves of the first electric field region 60 and the second electric field region 62 of the liquid crystal display element 10 of the present embodiment (VT IN FIRST ELECTRIC FIELD REGION, VT IN SECOND ELECTRIC FIELD REGION), and shows, for the frontal direction, a VT curve obtained by synthesizing the VT curves (SYNTHESIZED VT).

FIG. 7 shows, as examples, that a dielectric constant of the first insulating material from which the CF-side first insulating layer 42a is made which is that portion of the CF-side insulating layer 42 which corresponds to the first electric field region 60 is 3, and a dielectric constant of the second insulating material from which the CF-side second insulating layer 42b is made which is that portion of the CF-side insulating layer 42 which corresponds to the second electric field region 62 is 7.

As described with reference to (a) and (b) of FIG. 6, the director of the liquid crystal molecule 52 differs between the first electric field region 60 and the second electric field region 62 in a case where a same voltage is applied to the liquid crystal molecule 52. This is because a dielectric constant of the CF-side insulating layer 42 differs between the first electric field region 60 and the second electric field region 62.

Since the director of the liquid crystal molecule 52 differs between the first electric field region 60 and the second electric field region 62, a VT curve differs between the first electric field region 60 and the second electric field region 62.

In FIG. 7, specifically, a curve of a continuous line (VT IN FIRST ELECTRIC FIELD) represents the VT curve of the first electric field region 60, and a curve of a bold line (VT IN SECOND ELECTRIC FIELD) represents the VT curve of the second electric field region 62.

Further, in FIG. 7, a curve of a dotted line (SYNTHESIZED VT) represents the VT curve obtained by synthesizing the different VT curves. The liquid crystal display element 10 of the present embodiment is arranged such that gradation voltages are determined in accordance with the synthesized VT curve. In accordance with the synthesized VT curve in FIG. 7, e.g., a voltage of an intermediate gradation (intermediate voltage) is 4 V, and transmittances with respect to a reference are 35% and 60% which transmittances are those of light beams passed through the CF-side first insulating layer 42a (∈=3) and the CF-side second insulating layer 42b (∈=7), respectively.

The oblique gradations in FIG. 4, with respect to the frontal gradations, of the liquid crystal display element 10 of the present embodiment are found in accordance with the synthesized VT.

The oblique gradations in FIG. 17, with respect to the frontal gradations, of the liquid crystal display element 100 of the first comparative example are found in accordance with one VT curve, without the synthesis of VT curves, because only one VT curve is obtained from the liquid crystal display element 100 of the first comparative example.

The following describes the raise of transmittances of the oblique direction, with reference to FIGS. 4 and 17.

(Gradation-Luminance Ratio)

As shown in FIGS. 4 and 17, both the liquid crystal display element 10 of the present embodiment and the liquid crystal display element 100 of the first comparative example have a larger raise of the luminances with respect to the frontal direction as a polar angle increases.

However, the liquid crystal display element 10 of the present embodiment makes it possible to drastically suppress the raise of the luminances, as compared to the liquid crystal display element 100 of the first comparative example.

That is, the liquid crystal display element 10 of the present embodiment is lower in its viewing angle dependency than the liquid crystal display element 100 of the first comparative example.

This is because the liquid crystal display element 10 of the present embodiment has multiple VT characteristics as described above whereas the liquid crystal display element 100 of the first comparative example has no multiple VT characteristics although a parallel electric field is generated in the liquid crystal display element 100. That is, in the liquid crystal display element 100 of the first comparative example, an electric field is controlled only by the array substrate 22 on which the comb-tooth electrodes 30 are provided which serve as drive electrodes. Therefore, it is impossible to form, in one pixel, regions having respective different VT characteristics. As a result, the gradation-luminance ratios of the polar angle directions are raised with respect to the gradation luminance ratios of the frontal direction.

In contrast, the liquid crystal display element 10 of the present embodiment has, in one pixel, a region where two insulating layers are provided which have respective different dielectric constants. Therefore, one pixel has a region having two different VT characteristics. In other words, since the liquid crystal display element 10 of the present embodiment has multiple VT characteristics, the liquid crystal display element 10 makes it possible to suppress the raise of the luminance ratios of the oblique direction.

(Dielectric Constant Difference)

The following describes a preferable dielectric constant difference between insulating materials, with regard to the suppression of the raise of the luminance ratios of the oblique direction.

Specifically, the following deals with, as an example, a difference between (i) a dielectric constant of the first insulating material from which the CF-side first insulating layer 42a corresponding to the first electric field region 60 is made and (ii) a dielectric constant of the second insulating material from which the CF-side second insulating layer 42b corresponding to the second electric field region 62 is made, in order to describe a dielectric constant difference between adjacent insulating layers.

The explanation above with reference to FIG. 7 has dealt with, as an example, a case where the first insulating material has a dielectric constant of 3 whereas the second insulating material has a dielectric constant of 7. However, the dielectric constants of the first and second insulating materials in the present embodiment are not limited to this. This is described below with reference to FIG. 8.

Figure 8:
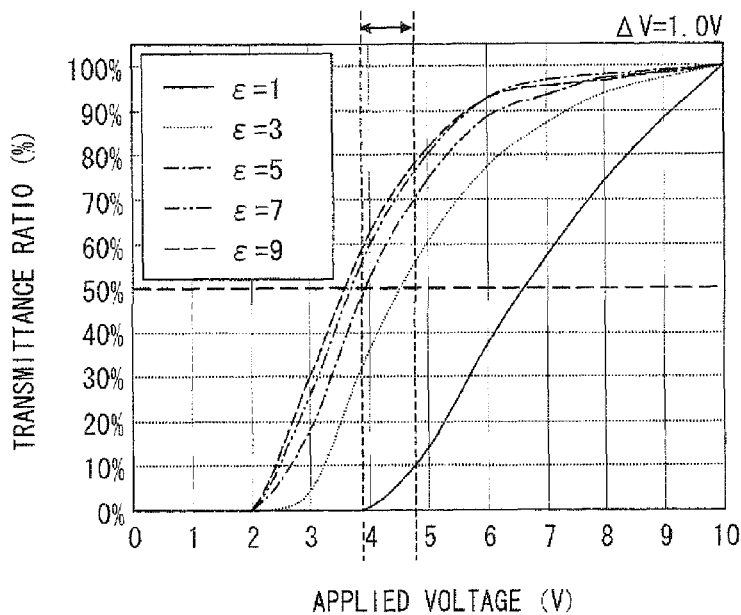
FIG. 8 is a graph showing VT curves corresponding respectively to dielectric constants.

FIG. 8 is a graph showing VT curves obtained in a case where a material from which the CF-side insulating layer 42 is made is varied in many ways. In FIG. 8, Specifically; a continuous line indicates a case where the dielectric constant is 1; a dotted line indicates a case where the dielectric constant is 3; a dashed-one dotted line indicates a case where the dielectric constant is 5; a dashed-two dotted line indicates a case where the dielectric constant is 7; and a dashed line indicates a case where the dielectric constant is 8.

FIG. 8 shows VT curves obtained by simulation in which the dielectric constant (s) was changed from 1 to 9.

In a case where the liquid crystal display element 10 is provided in a television or the like which carries out multipixel drive (MPD), $\Delta V$ is preferably not less than 0.8 V between regions having respective different VT characteristics. More preferably, $\Delta V$ is not less than 1.0 V between the regions.

In a case where e.g., an acrylic resin is employed as one of the insulating materials so that a dielectric constant ($\in$) of the one of the insulating materials is approximately 3, employing, as the other one of the insulating materials, a material whose dielectric constant ($\in$) is 7 allows to expect $\Delta V$ of 1.0 V. Specifically, an acrylic resin and SiN which is a material having a dielectric constant ($\in$) of 7 are used so that $\Delta \in$ is 4. Thus, $\Delta V$ of 1.0 V is achieved.

There was no significant difference between the VT curve obtained in a case where an insulating material having a dielectric constant ($\in$) of 9 is employed and the VT curve obtained in a case where an insulating material having a dielectric constant ($\in$) of 7 is employed.

In a case where a material having a dielectric constant ($\in$) of less than 3 is employed as the one of the insulating materials, it becomes easy to achieve a large $\Delta V$ (VT difference), as compared to a case where, as described above, a material having a dielectric constant ($\in$) of 3 is employed as the one of the insulating materials. However, a smaller dielectric constant (a) leads to a rise of an applied voltage. This can result in an increase of power consumption.

Thus, it is considered that a preferable dielectric constant difference (dielectric constant difference $\Delta \in$ between adjacent insulating layers) for VT multiplication is not less than 2, or more preferably, not less than 3.

(Thickness of Insulating Film)

The following deals with a thickness of an insulating layer. The explanation above has dealt with, as an example, a case where the thickness of the CF-side insulating layer 42, specifically, respective thicknesses of the CF-side first insulating layer 42a and the CF-side second insulating layer 42b are 3 µm, in order to describe a viewing angle characteristics.

As described above, the thickness of the CF-side insulating layer 42 is not limited to 3 µm.

FIG. 9 is a graph showing a relationship between frontal gradations and gradation-luminance ratios of the oblique direction, for a case where in the present embodiment, the CF-side first insulating layer 42a and the CF-side second insulating layer 42b have a thickness of 2 µm.

In FIG. 9: a continuous line indicates a polar angle of 0° (frontal direction); a dotted line indicates a polar angle of 10°; a dashed-one dotted line indicates a polar angle of 20°; a dashed-two dotted line indicates a polar angle of 30°; a dashed line indicates a polar angle of 40°; and a bold line indicates a polar angle of 60°. As is the case with FIG. 4, an azimuth is a direction tilted by 45° with respect to the absorption axis of the polarization plate.

The liquid crystal display element 10 was visually evaluated, and viewing angle levels were quantified. As a result, a viewing angle characteristic (viewing angle level) was good in a case where a difference between a gradation-luminance ratio of the frontal direction and a gradation-luminance ratio at a polar angle of 60° (the difference is indicated by a two-headed arrow in FIG. 9) was less than 38%. A viewing angle characteristic was better in a case where the difference is less than 26%.

In a case where the CF-side first insulating layer 42a and the CF-side second insulating layer 42b had a thickness of 2 μm in the liquid crystal display element 10 of the first embodiment, the difference between the gradation-luminance ratio of the frontal direction and the gradation-luminance ratio at a polar angle of 60° was 26%, as shown in FIG. 9. In this case, it was possible to obtain a good viewing angle characteristic which caused a small raise of luminance ratios. In general, the raise of luminance ratios becomes larger as a polar angle increases. In the present embodiment, a polar angle of 60° is an angle at which a conventional raise of luminance ratios was significantly remedied.

As for that arrangement corresponding to FIG. 4 in which the CF-side first insulating layer 42a and the CF-side second insulating layer 42b had a thickness of 3 μm, the difference was 25%. Thus, a better viewing angle characteristic was obtained.

In a case where the CF-side first insulating layer 42a and the CF-side second insulating layer 42b similarly had a thickness of 1 μm in the liquid crystal display element 10 of the present embodiment, the difference was 30%. Thus, a good viewing angle characteristic was obtained.

In contrast, in cases where the thickness of the CF-side insulating layer in the liquid crystal display element 100 of the first comparative example was changed to each of 1 μm, 2 μm, and 3 μm, any of these thicknesses did not make it possible to obtain a good viewing angle characteristic.

An outline of the evaluation above is as below. The liquid crystal display element 10 was placed on a backlight so that (i) a voltage-transmittance change of the frontal direction, and (ii) a voltage-transmittance change of a polar angle direction which is in an azimuth direction tilted by 45° with respect to the polarization axis were measured by use of Ez-contrast manufactured by ELDIM Co. Then, a change in viewing angle level of the oblique direction with respect to the curve of the frontal direction was checked.

Second Comparative Example

The following describes an arrangement of another comparative example which is compared in viewing angle characteristic etc. with the liquid crystal display element 10 of the present embodiment.

Figure 18:
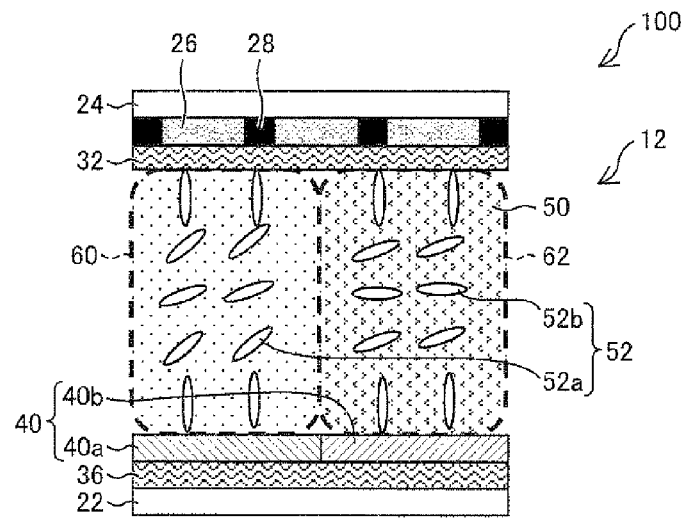
FIG. 18 is a cross-sectional view schematically illustrating an arrangement of a liquid crystal display element of a second comparative example.

FIG. 18 is a cross-sectional view illustrating a schematic arrangement of a liquid crystal display element 100 of the second comparative example. With reference to FIG. 18, the following mainly describes differences between the liquid crystal display element 100 and the liquid crystal display element 10 of the first embodiment.

The liquid crystal display element 10 of the first embodiment and the liquid crystal display element 100 of the second comparative example have respective different liquid crystal modes. That is, the liquid crystal display element 100 of the second comparative example is a liquid crystal display element 100 of a vertical alignment (VA) type and a vertical electric filed type.

Therefore, electrodes are arranged such that an array electrode 36 which serves as a pixel electrode is provided on an array substrate 22 whereas a counter electrode 32 is provided on a CF substrate 24 which serves as a counter substrate.

In a case where no electric voltage is applied to liquid crystal molecules 52, the liquid crystal molecules 52 are aligned perpendicularly to the array substrate 22 and the CF substrate 24.

In the liquid crystal display element 100 of the second comparative example, an insulating layer having different dielectric constants are provided on the array substrate 22. Specifically, an array-side insulating layer 40 is provided on the array electrode 36. The array-side insulating layer 40 is made up of an array-side first insulating layer 40a and an array-side second insulating layer 40b. An insulating material for the array-side first insulating layer 40a and an insulating material for the array-side second insulating layer 40b are different in dielectric constant.

The following concretely describes the arrangement of the liquid crystal display element 100, together with an overview of a method for manufacturing the liquid crystal display element 100.

As illustrated in FIG. 18, an ITO electrode which serves as the array electrode 36 is formed in such a manner that a film made from ITO is formed, by a sputtering method, on an entire surface of a glass substrate which serves as the array substrate 22. Then, in order that two insulating layer regions having respective different dielectric constants are formed, an insulating layer is formed by a spin coating method so as to cover an entire surface of the array electrode 36. An insulating material for the insulating layer is an acrylic insulating material having a dielectric constant ($\in$) of 3.7. The insulating layer has a film thickness from 1 μm to 3 μm.

Then, the insulating material corresponding to nearly half the two-region range 12 is removed by photolithography. Then, in a hollow thus formed, an insulating layer made from SiN ($\in$=6.9) is formed by a sputtering method so as to have the same film thickness as the insulating layer made from the acrylic insulating material.

Thus, the insulating layer which has been made first from the acrylic insulating material serves as the array-side first insulating layer 40a, and the insulating layer made from SiN serves as the array-side second insulating layer 40b.

Then, the alignment-film coating material manufactured by JSR Corp. (product name: JALS-204 (5 wt. %, gamma-butyrolactone solution)) is applied onto the array-side insulating layer 40 by a spin coating method, and a semifinished product thus fabricated is then baked for 2 hours at 200° C.

Further, cooler filters 26 and black matrixes 28 are provided on the CF substrate 24 which serves as a counter substrate which is opposed to the array substrate. Then, the alignment-film coating material manufactured by JSR Corp. (product name: JALS-204 (5 wt. %, gamma-butyrolactone solution)) is applied onto the color filters 26 and the black matrixes 28 by a spin coating method, and a semifinished product thus fabricated is then baked for 2 hours at 200° C.

An alignment film thus formed (not illustrated) on an array substrate 22 side and an alignment film thus formed (not illustrated) on a CF substrate 24 side have a film thickness of 1000 Å.

Then, 3.25-μm resin beads manufactured by Sekisui Chemical Co., Ltd. (Micropearl SP20325) are dispersed on one of the array substrate 22 and the CF substrate 24. On the other hand, the sealing resin manufactured by Mitsui Toatsu Chemicals, Inc. (STRUCTBOND XN-21S) is printed on an opposed substrate to which the one of the array substrate 22 and the CF substrate 24 is attached. Then, the array substrate 22 and the CF substrate 24 are attached to each other, and baked for 1 hour at 135° C. so that a liquid crystal cell is fabricated.

Then, a negative type liquid crystal material (Δ∈=−3, Δn=0.1) manufactured by Merck Ltd. is injected into the liquid crystal cell by a liquid crystal filling vacuum injection method. Then, a polarization plate is attached to the liquid crystal cell. The liquid crystal display element 100 is thus fabricated.

Evaluation of the liquid crystal display element 100 was carried out in the same manner above. That is, the liquid crystal display element 100 was placed on a backlight so that (i) a voltage-transmittance change of the frontal direction, and (ii) a voltage-transmittance change of a polar angle direction which is in an azimuth direction tilted by 45° with respect to the polarization axis were measured by use of Ez-contrast manufactured by ELDIM Co. Then, a change in viewing angle level of the oblique direction with respect to the curve of the frontal direction was checked.

In cases where the thicknesses of the array-side first insulating layer 40a and the array-side second insulating layer 40b in the liquid crystal display element 100 of the second comparative example were changed from 1 μm to 3 μm, any thickness did not make it possible to obtain a good viewing angle characteristic.

(Summary of Characteristic)

(a) and (b) of FIG. 10 show summaries of the characteristics of the liquid crystal display elements 10 and 100, respectively. Specifically, (a) of FIG. 10 shows the characteristic of the liquid crystal display element 10 of the present embodiment. (b) of FIG. 10 shows characteristics of liquid crystal display elements 100 of comparative examples.

In (a) and (b) of FIG. 10, FIRST INSULATING LAYER THICKNESS and SECOND INSULATING LAYER THICKNESS indicate, with respect to each of arrangements, thicknesses of the array-side first insulating layer and the array-side second insulating layer, or thicknesses of the CF-side first insulating layer and the CF-side second insulating layer, respectively.

In the first comparative example, FIRST INSULATING LAYER THICKNESS indicates a thickness of the array-side insulating layer 40.

VIEWING ANGLE LEVEL indicates a result of visual evaluation of a viewing angle level.

VIEWING ANGLE LEVEL (DIFFERENCE) indicates a difference between a gradation luminance ratio of the frontal direction and a gradation luminance ratio at a polar angle of 60°.

As shown in (a) of FIG. 10, the liquid crystal display element 10 of the first embodiment exhibited a good viewing angle level (indicated by a circle) for any of the following thicknesses of the array-side insulating layer 40: 1 μm, 2 μm, and 3 μm. Particularly, in a case where the array-side insulating layer 40 has a thickness of 2 μm or 3 μm, the difference was not more than 26%, and the viewing angle level was better (indicated by a double circle).

In contrast, the liquid crystal display elements 100 of the first and second comparative examples exhibited differences of more than 38% for any thicknesses of the array-side insulating layer 40 and the CF-side insulating layer 42. The viewing angle levels were also not good (indicated by a cross).

Second Embodiment

The following describes another embodiment of the liquid crystal display element 10 of the present invention, with reference to FIGS. 11 and 12.

For convenience of explanation, members having the same functions as those of the members in the drawings described in the first embodiment are given common reference signs, and descriptions of such members are omitted below.

A liquid crystal display element 10 of the present embodiment is different from the liquid crystal display element 10 of the first embodiment in that none of the third electrode 34 nor the array-side insulating layer 40 is provided on the array substrate 22. That is, the liquid crystal display element 10 of the present embodiment does not have the so-called FFS structure.

The following concretely describes an arrangement of the liquid crystal display element 10, together with an overview of a method for manufacturing the liquid crystal display element 10.

As illustrated in FIG. 11, comb-tooth electrodes 30 made from ITO are provided on a glass substrate which serves as the array substrate 22 so that the comb-tooth electrodes 30 have an electrode width of 4 μm and an electrode pitch of 4 μm. Then, an alignment film (not illustrated) is formed on the comb-tooth electrodes 30, specifically, on the comb-tooth electrodes 30 and on those portions of the array substrate 22 on which no comb-tooth electrode 30 is provided (hereinafter, also simply referred to as "on the comb-tooth electrodes 30"). Specifically, the alignment-film coating material manufactured by JSR Corp. (product name: JALS-204 (5 wt. %, gamma-butyrolactone solution)) is applied onto the comb-tooth electrodes 30 by a spin coating method, and a semifinished product thus fabricated is then baked for 2 hours at 200° C.

On the other hand, the color filters 26 and the black matrixes 28 are provided on the CF substrate 24 which is a substrate opposed to the array substrate 22. Then, a film made from ITO is formed, by a sputtering method, on an entire surface of a layer made up of the color filters 26 and the black matrixes 28. The counter electrode 32 is thus formed.

Then, the CF-side first insulating layer 42a and the CF-side second insulating layer 42b which are different in dielectric constant are provided on the counter electrode 32 as the CF-side insulating layer 42. Specifically, an acrylic insulating film having ∈ of 3.7 is formed on the counter electrode 32 by a spin coating method so as to have a thickness from 1 μm to 3 μm. Then, that portion of the acrylic insulating layer which corresponds to a region having one of different dielectric constants is removed by photolithography. A remaining portion of the acrylic insulating layer serves as the CF-side first insulating layer 42a. Then, a film made from SiN (∈=6.9) is formed, in a hollow thus formed, by a sputtering method so as to have the same film thickness as the CF-side first insulating layer 42a. The CF-side second insulating layer 42b is thus formed.

Then, the alignment-film coating material manufactured by JSR Corp. (product name: JALS-204 (5 wt. %, gamma-butyrolactone solution)) is applied onto the CF-side insulating layer 42 by a spin coating method, and a semifinished product thus fabricated is then baked for 2 hours at 200° C. The alignment film (not illustrated) is thus formed. The alignment film of the array substrate 22 and that of the CF substrate 24 have a film thickness of 1000 Å.

Then, the resin beads manufactured by Sekisui Chemical Co., Ltd. which resin beads have a diameter of 3.25 μm (Micropearl SP20325) are dispersed on one of the array substrate 22 and the CF substrate 24. On the other hand, the sealing resin manufactured by Mitsui Toatsu Chemicals, Inc. (STRUCTBOND XN-21S) is printed on a substrate opposed to the one of the array substrate 22 and the CF substrate 24 (i.e., printed on the CF substrate 24 or the array substrate 22). Then, the array substrate 22 and the CF substrate 24 are attached to each other, and then, baked for 1 hour at 135° C. so that a liquid crystal cell is fabricated.

Then, the positive type liquid crystal material (Δ∈=20, Δn 0.15) manufactured by Merck Ltd. is injected into the liquid crystal cell by a liquid crystal filling vacuum injection method, and then, the liquid crystal cell is sealed. Then, a polarization plate is attached to the liquid crystal cell. The liquid crystal display element 10 is thus fabricated.

Third Comparative Example

With reference to FIG. 19, the following describes that liquid crystal display element 100 of a third comparative example which is compared with the liquid crystal display element 10 of the second embodiment. FIG. 19 is a cross-sectional view illustrating a schematic arrangement of the liquid crystal display element 100 of the third comparative example.

The liquid crystal display element 100 of the third comparative example is different from the liquid crystal display element 10 of the second embodiment in that neither of the counter electrode 32 nor the CF-side insulating layer 42 is provided on the CF substrate 24.

The following concretely describes an arrangement of the liquid crystal display element 100, together with an overview of a method for manufacturing the liquid crystal display element 100.

As illustrated in FIG. 19, the comb-tooth electrodes 30 having an electrode width of 4 pin and an electrode pitch of 4 μm are formed on the array substrate 22 in such a manner that an film made from ITO is formed, by a sputtering method, on an entire surface of a glass substrate which serves as the array substrate 22, and then the film is patterned by photolithography.

Then, an alignment film (not illustrated) is formed on the comb-tooth electrodes 30 in such a manner that the alignment-film coating material manufactured by JSR Corp. (product name: JALS-204 (5 wt. %, gamma-butyrolactone solution)) is applied onto the comb-tooth electrodes 30 by a spin coating method, and a semifinished product thus fabricated is then baked for 2 hours at 200° C.

On the other hand, the color filters 26 and the black matrixes 28 are provided on the CF substrate 24. Then, an alignment film (not illustrated) is formed on the color filters 26 and the black matrixes 28 in such a manner that the alignment-film coating material manufactured by JSR Corp. (product name: JALS-204 (5 wt. %, gamma-butyrolactone solution)) is applied onto the color filters 26 and the black matrixes 28 by a spin coating method, and a semifinished product thus fabricated is then baked for 2 hours at 200° C. Respective alignment films of the array substrate 22 and the CF substrate 24 have a film thickness of 1000 Å.

Then, the resin beads manufactured by Sckisui Chemical Co., Ltd. which resin beads have a diameter of 3.25 μm (Micropearl SP20325) are dispersed on one of the array substrate 22 and the CF substrate 24. On the other hand, the sealing resin manufactured by Mitsui Toatsu Chemicals, Inc. (STRUCTBOND XN-21S) is printed on a substrate opposed to the one of the array substrate 22 and the CF substrate 24 (i.e., printed on the CF substrate 24 or the array substrate 22). Then, the array substrate 22 and the CF substrate 24 are attached to each other, and then, baked for 1 hour at 135° C. so that a liquid crystal cell is fabricated.

Then, the positive type liquid crystal material (Δ∈=20, Δn=0.15) manufactured by Merck Ltd. is injected into the liquid crystal cell by a liquid crystal filling vacuum injection method, and then, the liquid crystal cell is sealed. Then, a polarization plate is attached to the liquid crystal cell. The liquid crystal display element 100 is thus fabricated.

(Evaluation)

With reference to (a) and (b) of FIG. 10, the following describes viewing angle levels etc. of the liquid crystal display element 10 of the second embodiment and the liquid crystal display element 100 of the third comparative example.

As shown in (a) of FIG. 10, even in cases where the CF-side first insulting layer 42a and the CF-side second insulating layer 42b had each of the thicknesses 1 μm, 2 μm, and 3 μm, the liquid crystal display element 10 of the second embodiment visually exhibited good viewing angle levels, and differences of less than 38% at which a good viewing characteristic can be obtained.

In contrast, the liquid crystal display element 100 of the third comparative example exhibited a large difference of 53%, and also a viewing angle level which was not good.

(Raise of Luminance)

The following describes one example of a raise of luminances of each of the liquid crystal display element 10 of the present embodiment and the liquid crystal display element 100 of the third comparative example.

As is the case with FIG. 9 which has been described, each of FIGS. 12 and 20 is a graph showing a relationship between frontal gradations and gradation luminance ratios. Specifically, FIG. 12 shows gradation luminance ratios (raise of luminances) obtained in a case where the CF-side insulating layer 42 of the liquid crystal display element 10 of the present embodiment has a thickness of 1 μm. On the other hand, FIG. 20 shows gradation luminance ratios (raise of luminances) of the liquid crystal display element 100 of the third comparative example.

As shown in FIG. 12, in a case where the CF-side first insulating layer 42a and the CF-side second insulating layer 42h of the liquid crystal display element 10 of the present embodiment had a thickness of 1 μm, a difference at a polar angle of 60° was 34%. Thus, the liquid crystal display element 10 exhibited a good viewing angle characteristic.

In contrast, as shown in FIG. 20, the liquid crystal display element 100 of the third comparative example exhibited a difference of 53% at a polar angle of 60°. Thus, the liquid crystal display element 100 had a large raise of luminances.

Third Embodiment

Figure 13:
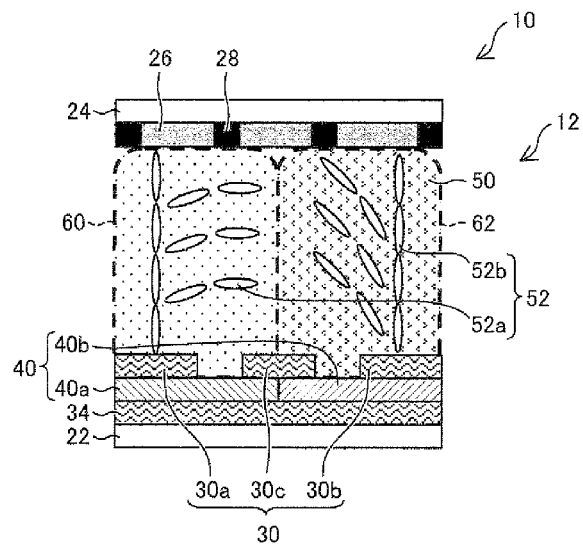
FIG. 13 is a cross-sectional view schematically illustrating an arrangement of a liquid crystal display element of still another embodiment of the present invention.
Figure 14:
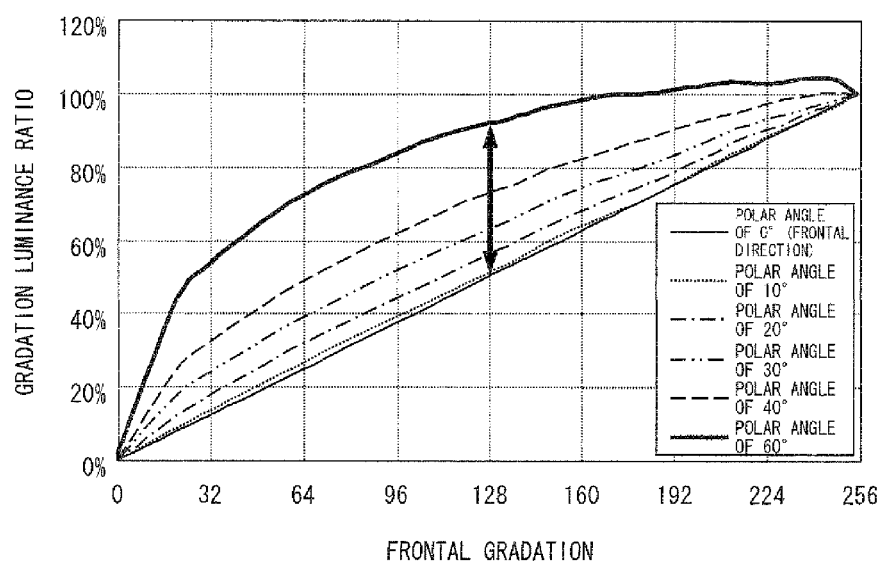
FIG. 14 is a graph showing oblique gradation luminance ratios with respect to frontal gradations.

The following describes still another embodiment of the liquid crystal display element 10 of the present invention, with reference to FIGS. 13, 14, etc.

For convenience of explanation, members having the same functions as those of the members in the drawings described in the embodiments above are given common reference signs, and descriptions of such members are omitted below.

A liquid crystal display element 10 of the present embodiment is different from the liquid crystal display element 10 of the first embodiment in that insulating layers are provided on the array substrate 22 which are different in dielectric constant. That is, the liquid crystal display element 10 of the first embodiment is arranged such that the CF-side insulating layer 42 is made up of the CF-side first insulating layer 42a and the CF-side second insulating layer 42b which are different in dielectric constant. In contrast, the liquid crystal display element 10 of the present embodiment is arranged such that the array-side insulating layer 40 of the array substrate 22 is made up of the array-side first insulating layer 40a and the array-side second insulating layer 40b which are different in dielectric constant.

The following concretely describes an arrangement of the liquid crystal display element 10, together with an overview of a method for manufacturing the liquid crystal display element 10.

As shown in FIG. 13, the third electrode 34 is formed on the array substrate 22 in such a manner that an film made from ITO is formed by a sputtering method on an entire surface of a glass substrate which serves as the array substrate 22.

In order that two regions are formed which are different in dielectric constant, then, an acrylic insulating material 1 having ∈ of 3.7 is applied, by a spin coating method, onto the third electrode 34 so that an insulating layer having a thickness of 3 μm is formed so as to cover an entire surface of the third electrode 34.

Then, that portion of the insulating layer which corresponds to a region having one of different dielectric constants is removed by photolithography. A remaining portion of the insulating layer serves as the array-side first insulating layer 40a.

Then, an insulating layer made from SiN (∈=6.9) which is an insulating material 2 is formed, by a sputtering method, in a hollow thus formed. The insulating layer made from the insulating material 2 has a thickness of 3 μm, which is equal to the thickness of the insulating layer made from the insulating material 1. The insulating layer made from the insulating material 2 serves as the array-side second insulating layer 40b.

As described above, the liquid crystal display element 10 of the present embodiment is arranged such that the array-side insulating layer 40 is made up of the array-side first insulating layer 40a and the array-side second insulating layer 40b which are two types of insulating layers having respective different dielectric constants.

Then, the comb-tooth electrodes 30 made from ITO are provided on the array-side insulating layer 40 so as to have an electrode width of 4 μm and an electrode pitch of 4 μm. Then, an alignment film (not illustrated) is formed on the comb-tooth electrodes 30 in such a manner that the alignment-film coating material manufactured by JSR Corp. (product name: JALS-204 (5 wt. %, gamma-butyrolactone solution)) is applied onto the comb-tooth electrodes 30 by a spin coating method, and a semifinished product thus fabricated is then baked for 2 hours at 200° C.

On the other hand, the color filters 26 and the black matrixes 28 are provided on a glass substrate which serves as the CF substrate 24, which is a substrate opposed to the array substrate 22. Then, an alignment film (not illustrated) is formed on the color filters 26 and the black matrixes 28 in such a manner that the alignment-film coating material manufactured by JSR Corp. (product name: JALS-204 (5 wt. %, gamma-butyrolactone solution)) is applied onto the color filters 26 and the black matrixes 28 by a spin coating method, and a semifinished product thus fabricated is then baked for 2 hours at 200° C. Respective alignment films of the array substrate 22 and the CF substrate 24 have a film thickness of 1000 Å.

Then, the resin beads manufactured by Sekisui Chemical Co., Ltd. which resin beads have a diameter of 3.25 μm (Micropearl SP20325) are dispersed on one of the array substrate 22 and the CF substrate 24. On the other hand, the sealing resin manufactured by Mitsui Toatsu Chemicals, Inc. (STRUCTBOND XN-21S) is printed on a substrate opposed to the one of the array substrate 22 and the CF substrate 24 (i.e., printed on the CF substrate 24 or the array substrate 22).

Then, the array substrate 22 and the CF substrate 24 are attached to each other, and then, baked for 1 hour at 135° C. so that a liquid crystal cell is fabricated.

Then, the positive type liquid crystal material ($\Delta\in=20$, $\Delta n=0.15$) manufactured by Merck Ltd. is injected into the liquid crystal cell by a liquid crystal filling vacuum injection method, and then, the liquid crystal cell is sealed. Then, a polarization plate is attached to the liquid crystal cell. The liquid crystal display element is thus fabricated.

Fourth Comparative Example

The following describes a liquid crystal display element 100 of a fourth comparative example, with reference to FIG. 21. FIG. 21 is a cross-sectional view illustrating a schematic arrangement of the liquid crystal display element 100 of the fourth comparative example.

As shown in FIG. 21, the liquid crystal display element 100 of the fourth comparative example is different from the liquid crystal display element 10 of the third embodiment in that the third electrode 34 is not provided on the array substrate 22. That is, the liquid crystal display element 100 of the fourth comparative example does not have the so-called FFS structure although the liquid crystal display element 100 has insulating layers having respective different dielectric constants.

The following concretely describes an arrangement of the liquid crystal display element 100, together with an overview of a method for manufacturing the liquid crystal display element 100.

As illustrated in FIG. 21, the acrylic insulating material 1 having ∈ of 3.7 is applied onto the array substrate 22 by a spin coating method so that an insulating layer having a thickness from 1 μm to 3 μm is formed so as to cover an entire surface of a glass substrate which serves as the array substrate 22. Then, that portion of the insulating layer which corresponds to a region having one of different dielectric constants is removed by photolithography. Then, an insulating layer made from SiN (∈=6.9) which is the insulating material 2 is formed, by a sputtering method, in a hollow thus formed. The insulating layer made from the insulating material 2 has the same film thickness as the insulating layer made from the insulating material 1.

Thus, the array-side first insulating layer 40a and the array-side second insulating layer 40b are formed which are made from the insulating materials 1 and 2, respectively.

Then, the comb-tooth electrodes 30 made from ITO are provided on the array-side insulating layer 40 so as to have an electrode width of 4 μm and an electrode pitch of 4 μm. Then, an alignment film (not illustrated) is formed on the comb-tooth electrodes 30 in such a manner that the alignment-film coating material manufactured by JSR Corp. (product name: JALS-204 (5 wt. %, gamma-butyrolactone solution)) is applied onto the comb-tooth electrodes 30 by a spin coating method, and a semifinished product thus fabricated is then baked for 2 hours at 200° C.

On the other hand, the color filters 26 and the black matrixes 28 are provided on a glass substrate which serves as the CF substrate 24, which is a substrate opposed to the array substrate 22. Then, an alignment film (not illustrated) is formed on the color filters 26 and the black matrixes 28 in such a manner that the alignment-film coating material manufactured by JSR Corp. (product name: JALS-204 (5 wt. %, gamma-butyrolactone solution)) is applied onto the color filters 26 and the black matrixes 28 by a spin coating method, and a semifinished product thus fabricated is then baked for 2 hours at 200° C. Respective alignment films of the array substrate 22 and the CF substrate 24 have a film thickness of 1000 Å.

Then, the resin beads manufactured by Sekisui Chemical Co., Ltd. which resin beads have a diameter of 3.25 μm (Micropearl SP20325) are dispersed on one of the array substrate 22 and the CF substrate 24. On the other hand, the sealing resin manufactured by Mitsui Toatsu Chemicals, Inc. (STRUCTBOND XN-21S) is printed on a substrate opposed to the one of the array substrate 22 and the CF substrate 24 (i.e., printed on the CF substrate 24 or the array substrate 22). Then, the array substrate 22 and the CF substrate 24 are attached to each other, and then, baked for 1 hour at 135° C. so that a liquid crystal cell is fabricated.

Then, the positive type liquid crystal material ($\Delta\in=20$, $\Delta n=0.15$) manufactured by Merck Ltd. is injected into the liquid crystal cell by a liquid crystal filling vacuum injection method, and then, the liquid crystal cell is sealed. Then, a polarization plate is attached to the liquid crystal cell. The liquid crystal display element 100 is thus fabricated.

(Viewing Angle Level)

With reference to (a) and (b) of FIG. 10, the following describes viewing angle levels etc. of the liquid crystal display element 10 of the third embodiment and the liquid crystal display element 100 of the fourth comparative example.

As shown in (a) of FIG. 10, in a case where the array-side first insulting layer 40a and the array-side second insulating layer 40b had a thickness of 3 μm, the liquid crystal display element 10 of the third embodiment visually exhibited a good viewing angle level, and a difference of less than 38% at which a good viewing characteristic can be obtained.

In contrast, the liquid crystal display element 100 of the third comparative example exhibited a difference of more than 38% and also a viewing angle level which was not good, for any of the thicknesses 1 μm, 2 μm, and 3 μm of the array-side first insulating layer 40a and the array-side second insulating layer 40b.

In cases where the array-side first insulating layer 40a and the array-side second insulating layer 40b of the liquid crystal display element 10 of the present embodiment had each of thicknesses of 1 μm and 2 μm, the liquid crystal display element 10 exhibited differences of 42% and 40% for the thicknesses, respectively. This indicates that although the liquid crystal display element 10 had an improvement in viewing angle level as compared to a conventional liquid crystal display element, the improvement is smaller than that of a case where the array-side first insulating layer 40a and the array-side second insulating layer 40b had a thickness of 3 μm. As for viewing angle levels, the liquid crystal display element 10 had worse viewing angle levels than that of the case where the array-side first insulating layer 40a and the array-side second insulating layer 40b had a thickness of 3 μm.

With reference to FIG. 14, the following describes that raise of luminance levels which occurs in a case where the array-side first insulating layer 40a and the array-side second insulating layer 40b of the liquid crystal display element 10 of the present embodiment have a thickness of 1 μm.

FIG. 14 is a graph showing a relationships between frontal gradations and gradation luminance ratios, as is the case with FIG. 9 which has been described. Specifically, FIG. 14 shows gradation luminance ratios (raise of luminances) obtained in a case where the array-side insulating layer 40 of the liquid crystal display element 10 of the present embodiment had a thickness of 1 μm.

In this case, as shown in FIG. 14, the liquid crystal display element 10 exhibited a difference of 42% at a polar angle of 60°. Although this indicates an improvement as compared to a conventional arrangement, the degree of the improvement was small.

This is considered as below. In a case where the array-side insulating layer 40 has a small thickness such as 1 μm, equi-potential lines do not differ in shape between the first electric field region 60 and the second electric field region 62 to the extent that respective VT curves of the first electric field region 60 and the second electric field region 62 differ significantly.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

For example, the explanation above mainly deals with such an arrangement that the comb-tooth electrodes 30 are provided on the array substrate 22. However, the liquid crystal display element of the present invention is not limited to the arrangement. Instead, the comb-tooth electrodes 30 can be provided on the CF substrate 24.

Further, the use of the liquid crystal display element as a display section makes it possible to make various liquid crystal display apparatuses such as liquid crystal televisions and mobile terminals.

Further, the liquid crystal display element of the present invention is arranged such that an electric potential which is applied to the liquid crystal molecules so as to display a halftone differs not less than 0.8 V between the at least two regions.

According to the arrangement, one pixel has two regions between which a halftone electric potential differs not less than 0.8 V. Accordingly, an orientation of the liquid crystal molecules differs between the two regions sufficiently for improvement of a viewing angle characteristic. This makes it possible to surely improve a viewing angle characteristic.

The halftone refers to a middle gradation level in the whole gradation range.

Further, the liquid crystal display element of the present invention is arranged such that a relative permittivity differs not less than 2 between the at least two insulating layers.

Further, the liquid crystal display element of the present invention is arranged such that a relative permittivity differs not less than 3 between the at least two insulating layers.

According to the arrangement, a relative permittivity differs not less than 2, or preferably not less than 3, between the at least two insulating layers. This makes it possible to vary shapes of equipotential lines between regions corresponding respectively to the insulating layers to the extent that an orientation of the liquid crystal molecules sufficiently differs between the regions. This makes it possible to surely improve a viewing angle characteristic.

Further, the liquid crystal display element of the present invention is arranged such that the at least two insulating layers have a same thickness.

According to the arrangement, the insulating layers have the same thickness. Therefore, there is no need to control a plurality of cell thicknesses (i.e., thicknesses of the liquid crystal layer) in a pixel. This allows easy manufacturing.

Further, in a case where a pixel has regions in which directors of the liquid crystal molecules are symmetrical to each other, a single cell thickness in the pixel prevents the breakdown of the symmetry of the directors. This makes it possible to further improve a viewing angle characteristic.

Further, a liquid crystal display element of the present invention further includes an electrode being provided in a pattern of teeth of a comb, within the pixel in the planar view, on or above one of the two substrates, the transverse electric field being generated between two adjacent teeth of the electrode, the pixel having at least two tooth combinations each of which corresponds to two adjacent teeth, the at least two insulating layers being provided, on or above at least one of the two substrates, to a region corresponding in the planar view to a first one of the two tooth combinations and to a region corresponding in the planar view to a second one of the two tooth combinations, respectively, the at least two insulating layers having respective different dielectric constants.

According to the arrangement, the insulating layers having respective different dielectric constants are provided to the region corresponding to one of the two tooth combinations of the comb-tooth electrode and to the region corresponding to the other of the two tooth combinations, respectively. That is, each of the insulating layers is provided in a position where a transverse electric field is generated.

This makes it possible to efficiently vary shapes of equipotential lines between the regions corresponding respectively to the insulating layers. This makes it possible to improve a viewing angle characteristic more effectively.

In the arrangement, the number of teeth of the comb-tooth electrode provided within one pixel is not particularly limited but may be determined freely. Accordingly, it is possible to provide insulating layers having respective different dielectric constants as many as the number of provided teeth, in other words, as many as the number of transverse electric fields to be generated.

Further, a liquid crystal display element of the present invention further includes: an electrode layer; and an insulating layer, the electrode layer and the insulating layer being provided in this order on that one of the two substrates on which the electrode is provided, the electrode being provided on the insulating layer.

According to the arrangement, the comb-tooth electrode is provided on the electrode layer via the insulating layer. That is, the arrangement has the so-called FFS (Fringe Field Switching) structure. This makes it possible to increase an aperture ratio. As a result, a transmittance can be increased.

Further, the liquid crystal display element of the present invention is arranged such that in the planar view, the insulating layer on the electrode layer is made up of at least two insulating layers having respective different dielectric constants.

According to the arrangement, insulating layers having respective different dielectric constants are provided on the insulating layer which is provided on the electrode layer.

Therefore, there is no need to provide an additional insulating layer. This makes it possible to easily form a liquid crystal display element.

Further, a liquid crystal display element of the present invention further includes: an electrode layer; and an insulating layer, the electrode layer and the insulating layer being provided in this order on that one of the two substrates on which the electrode is not provided, in the planar view, the insulating layer being made up of at least two insulating layers having respective different dielectric constants.

According to the arrangement, the insulating layer having respective different dielectric constants are provided on the substrate which is opposed to the substrate on which the comb-tooth electrode for generating transverse electric fields is provided.

This makes it possible to efficiently vary shapes of equipotential lines between the regions corresponding respectively to the insulating layers. This makes it possible to improve a viewing angle characteristic more effectively.

Further, the liquid crystal display element of the present invention is arranged such that: one of the two substrates is a color filter substrate on which a color filter is provided; and the electrode is provided on or above the color filter substrate.

Further, a liquid crystal display apparatus of the present invention includes any one of the liquid crystal display elements.

INDUSTRIAL APPLICABILITY

The liquid crystal display element of the present invention can be made by a simple manufacturing method, and can achieve a wide viewing angle. Therefore, the liquid crystal display element is suitably applicable to a liquid crystal display apparatus etc. which are require to perform high-quality display.

REFERENCE SIGNS LIST

10 Liquid crystal display element
12 Two-region range
22 Array substrate (substrate)
24 CF substrate (substrate)
30 Comb-tooth electrode (electrode having a shape like a comb tooth)
30a First comb-tooth electrode (electrode having a shape like a comb tooth)
30b Second comb-tooth electrode (electrode having a shape like a comb tooth)
30c Third comb-tooth electrode (electrode having a shape like a comb tooth)
32 Counter electrode (electrode layer)
34 Third electrode (electrode layer)
40 Array-side insulating layer (insulating layer)
40a Array-side first insulating layer (insulating layer)
40b Array-side second insulating layer (insulating layer)
42 CF-side insulating layer (insulating layer)
42a CF-side first insulating layer (insulating layer)
42b CF-side second insulating layer (insulating layer)
50 Liquid crystal layer
51 Liquid crystal molecule
52a First liquid crystal molecule (liquid crystal molecule)
52b Second liquid crystal molecule (liquid crystal molecule)
60 First electric field region (region)
62 Second electric field region (region)
100 Liquid crystal display element

The invention claimed is:

1. A liquid crystal display element comprising:

two substrates;

a liquid crystal layer sandwiched between the two substrates; and at least two insulating layers having respective different dielectric constants, the liquid crystal display element being a vertical alignment type liquid crystal display element which controls an orientation of liquid crystal molecules in the liquid crystal layer by use of a transverse electric field so as to carry out display, the at least two insulating layers being provided, within a pixel in a planar view, on or above at least one of the two substrates so that at least two regions which differ in shapes of equipotential lines are formed in the pixel due to generation of the transverse electric field;

an electrode being provided in a pattern of teeth of a comb, within the pixel in the planar view, on or above one of the two substrates, the transverse electric field being generated between two adjacent teeth of the electrode, the pixel having at least two tooth combinations each of which corresponds to two adjacent teeth, the at least two insulating layers being provided, on or above at least one of the two substrates, to a region corresponding in the planar view to a first one of the two tooth combinations and to a region corresponding in the planar view to a second one of the two tooth combinations, respectively, the at least two insulating layers having respective different electric constants.

2. The liquid crystal display element as set forth in claim 1, wherein an electric potential which is applied to the liquid crystal molecules so as to display a halftone differs not less than 0.8 V between the at least two regions.

3. The liquid crystal display element as set forth in claim 1, wherein a relative permittivity differs not less than 2 between the at least two insulating layers.

4. The liquid crystal display element as set forth in claim 1, wherein a relative permittivity differs not less than 3 between the at least two insulating layers.

5. The liquid crystal display element as set forth in claim 1, wherein the at least two insulating layers have a same thickness.

6. A liquid crystal display element as set forth in claim 1, further comprising:
   an electrode layer; and
   an insulating layer,
   the electrode layer and the insulating layer being provided in this order on that one of the two substrates on which the electrode is provided,
   the electrode being provided on the insulating layer.

7. The liquid crystal display element as set forth in claim 6, wherein in the planar view, the insulating layer on the electrode layer is made up of at least two insulating layers having respective different dielectric constants.

8. A liquid crystal display element as set forth in claim 1, further comprising:
   an electrode layer; and
   an insulating layer,
   the electrode layer and the insulating layer being provided in this order on that one of the two substrates on which the electrode is not provided,
   in the planar view, the insulating layer being made up of at least two insulating layers having respective different dielectric constants.

9. The liquid crystal display element as set forth in claim 1, wherein:
   one of the two substrates is a color filter substrate on which a color filter is provided; and
   the electrode is provided on or above the color filter substrate.

10. A liquid crystal display apparatus comprising a liquid crystal display element recited in claim 1.

* * * * *